(12) United States Patent
Gervasio et al.

(10) Patent No.: US 10,699,471 B2
(45) Date of Patent: *Jun. 30, 2020

(54) METHODS AND SYSTEMS FOR RENDERING FRAMES BASED ON A VIRTUAL ENTITY DESCRIPTION FRAME OF A VIRTUAL SCENE

(71) Applicant: Verizon Patent and Licensing Inc., Arlington, VA (US)

(72) Inventors: William Patrick Gervasio, Liberty Corner, NJ (US); Oliver S. Castaneda, Rochester, NY (US); Denny Breitenfeld, Florham Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,090

(22) Filed: Apr. 26, 2019

(65) Prior Publication Data
US 2019/0251737 A1   Aug. 15, 2019

Related U.S. Application Data

(63) Continuation of application No. 15/610,572, filed on May 31, 2017, now Pat. No. 10,311,630.

(51) Int. Cl.
*G06T 15/20* (2011.01)
*H04N 21/218* (2011.01)
(Continued)

(52) U.S. Cl.
CPC .......... *G06T 15/20* (2013.01); *H04N 19/597* (2014.11); *H04N 21/21805* (2013.01);
(Continued)

(58) Field of Classification Search
CPC ............ G06T 13/00–80; G06T 19/006; G06T 2210/21
See application file for complete search history.

(56) References Cited

U.S. PATENT DOCUMENTS

| 5,977,978 A | 11/1999 | Carey et al. |
| 6,040,836 A | 3/2000 | Shiitani et al. |

(Continued)

FOREIGN PATENT DOCUMENTS

| EP | 2051533 | 4/2009 |
| EP | 2384001 | 11/2011 |

OTHER PUBLICATIONS

Cuervo, et al., "High-Quality Mobile Gaming Using GPU Offload", Proceedings of the 13th Annual International Conference on Mobile Systems, Applications, and Services, Mobisys '15, Florence, Italy, May 18-22, 2015, Jan. 2015, pp. 121-135, XP055537862.

(Continued)

*Primary Examiner* — Daniel F Hajnik

(57) ABSTRACT

An exemplary virtual scene capture system maintains state data for a virtual object and a virtual vantage point that are both included within a virtual 3D space of a virtual scene. Based on the state data, the capture system generates a virtual entity description frame representative of a state of the virtual object and/or the virtual vantage point. The virtual entity description frame includes a link to color data representative of the virtual object and stored in an asset storage system associated with the capture system. The capture system provides the virtual entity description frame to a 3D rendering engine associated with the virtual vantage point and configured to render, based on state data represented in the virtual entity description frame and color data for the virtual object and accessed from the asset storage system using the link, a color data frame associated with the virtual vantage point.

20 Claims, 12 Drawing Sheets

(51) Int. Cl.
  *H04N 21/81*     (2011.01)
  *H04N 19/597*    (2014.01)
  *H04N 21/6587*   (2011.01)

(52) U.S. Cl.
  CPC ....... *H04N 21/816* (2013.01); *H04N 21/8146* (2013.01); *H04N 21/6587* (2013.01)

(56) References Cited

U.S. PATENT DOCUMENTS

| | | |
|---|---|---|
| 6,486,908 B1 | 11/2002 | Chen et al. |
| 6,643,413 B1 | 11/2003 | Shum et al. |
| 8,134,558 B1 | 3/2012 | Mayhew |
| 8,494,215 B2 | 7/2013 | Kimchi et al. |
| 8,675,013 B1 | 3/2014 | Romaszewicz et al. |
| 9,102,055 B1 | 8/2015 | Konolige et al. |
| 9,390,553 B2 | 7/2016 | Tokashiki et al. |
| 9,404,740 B2 | 8/2016 | Babayoff |
| 9,486,921 B1 | 11/2016 | Straszheim et al. |
| 9,569,812 B1 | 2/2017 | Kopf et al. |
| 2002/0113756 A1 | 8/2002 | Tuceryan et al. |
| 2003/0231179 A1 | 12/2003 | Suzuki |
| 2006/0109266 A1 | 5/2006 | Itkowitz et al. |
| 2006/0149516 A1 | 7/2006 | Bond et al. |
| 2007/0076920 A1 | 4/2007 | Ofek |
| 2007/0273692 A1 | 11/2007 | Woo et al. |
| 2008/0059956 A1 | 3/2008 | Su |
| 2009/0079731 A1 | 3/2009 | Fitzmaurice et al. |
| 2010/0050082 A1 | 2/2010 | Katz et al. |
| 2010/0091036 A1 | 4/2010 | Wright et al. |
| 2011/0018902 A1 | 1/2011 | Ofek |
| 2011/0063415 A1 | 3/2011 | Gefen et al. |
| 2012/0050256 A1 | 3/2012 | Thiel et al. |
| 2012/0069051 A1 | 3/2012 | Hagbi et al. |
| 2012/0218266 A1 | 8/2012 | Maeta et al. |
| 2013/0021338 A1 | 1/2013 | Shuster et al. |
| 2014/0002443 A1 | 1/2014 | Cunningham |
| 2014/0125701 A1 | 5/2014 | Hayakawa |
| 2015/0050997 A1 | 2/2015 | Suzman et al. |
| 2015/0324940 A1 | 11/2015 | Samson et al. |
| 2015/0346812 A1 | 12/2015 | Cole et al. |
| 2016/0029017 A1 | 1/2016 | Liang et al. |
| 2016/0189426 A1 | 6/2016 | Thomas et al. |
| 2016/0320951 A1* | 11/2016 | Ernst .................... G06F 3/04842 |
| 2017/0064148 A1 | 3/2017 | Muninder et al. |
| 2017/0124772 A1* | 5/2017 | Baszucki ................ G06T 13/40 |
| 2017/0147064 A1 | 5/2017 | Yang et al. |
| 2017/0249770 A1* | 8/2017 | Mori .................... G06K 9/00744 |
| 2017/0359467 A1 | 12/2017 | Norris et al. |
| 2018/0108110 A1 | 4/2018 | Cuervo et al. |
| 2018/0114264 A1 | 4/2018 | Rafii et al. |
| 2018/0146189 A1 | 5/2018 | Park |
| 2018/0210627 A1 | 7/2018 | Woo et al. |
| 2019/0028616 A1* | 1/2019 | Furukawa ................ G06T 7/596 |

OTHER PUBLICATIONS

Lee, et al., "Outatime: Using Speculation to Enable Low-Latency Continuous Interaction for Cloud Gaming", Internet Citation, Aug. 21, 2014 {Aug. 21, 2014), pp. 1-14, XP002740655, Retrieved from the Internet: URL: http://research.microsoft.com/pubs/226843/outatime_techreport2014.pdf [retrieved on Jun. 9, 2015].

Reinert, et al., "Proxy-guided Image-based Rendering for Mobile Devices", Computer Graphics Forum, vol. 35, No. 7, Oct. 2016 (Oct. 2016), pp. 353-362, XP055537861, GB.

Shi, et al., "A real-time remote rendering system for interactive mobile graphics", ACM Transactions on Multimedia Computing, Communications, and Applications, vol. 8, No. 3s, Sep. 2012 (Sep. 2012), pp. 1-20, XP055177467.

\* cited by examiner

METHODS AND SYSTEMS FOR RENDERING FRAMES BASED ON A VIRTUAL ENTITY DESCRIPTION FRAME OF A VIRTUAL SCENE

RELATED APPLICATIONS

This application is a continuation application of U.S. patent application Ser. No. 15/610,572, filed May 31, 2017, and entitled "Methods and Systems for Rendering Frames of a Virtual Scene from Different Vantage Points Based on a Virtual Entity Description Frame of the Virtual Scene," which is hereby incorporated by reference in its entirety.

BACKGROUND INFORMATION

Users may experience virtual three-dimensional ("3D") spaces (e.g., based on virtual, real-world, or mixed reality scenes) for various reasons and in connection with various types of applications. For example, users may experience virtual 3D spaces for entertainment purposes, educational purposes, long-distance communication purposes, vicarious experience/travel purposes, or in connection with various other purposes and/or applications.

Virtual reality is one example of an application where users experience virtual 3D spaces. Virtual reality media content may be used to immerse users (i.e., viewers of the virtual reality media content) into interactive virtual reality worlds that users may experience by directing their attention to any of a variety of things being presented in the immersive virtual reality world at the same time. For example, at any time during the presentation of the virtual reality media content, a user experiencing the virtual reality media content may look around the immersive virtual reality world in any direction, giving the user a sense that he or she is actually present in and experiencing the immersive virtual reality world from a particular viewpoint or vantage point within the immersive virtual reality world.

In some examples, users may desire the flexibility of being able to experience a virtual 3D space (e.g., an immersive virtual reality world) from an arbitrary virtual vantage point within the virtual 3D space. In other words, the user may wish to move around to different locations within the virtual 3D space at will to experience the virtual 3D space (e.g., to view objects presented within the virtual 3D space, etc.) from arbitrary virtual vantage points anywhere within the virtual 3D space that the user may dynamically choose. To provide the user this freedom of movement to the different locations, conventional media player devices have typically received data representative of the virtual 3D space (e.g., 3D models of objects within the 3D space and the like) prior to the time when the user experiences the virtual 3D space. For example, a conventional media player device may download and store data (e.g., 3D models, textures, etc.) associated with a virtual 3D space on a local storage facility such as a hard drive of the media player device, or may access data associated with the virtual 3D space from a local physical medium accessible to the media player device (e.g., a physical disc). Unfortunately, however, more setup may be required by a user prior to experiencing such a virtual 3D space (e.g., setup associated with downloading, installing, loading into memory, etc., data content representative of the virtual 3D space), and it may be difficult for the virtual 3D space in such examples to reflect live or real-time updates to the content due to the requirement for much of the data to be received by the media player device prior to the user experience.

Moreover, even if all the data representative of the virtual 3D space were to be transmitted to a media player device in real time, data representing individual 3D models of objects included within the virtual 3D space may allow the virtual 3D space to be rendered from arbitrary virtual vantage points within the virtual 3D space, but may not be scalable to present larger virtual 3D spaces or virtual 3D spaces including more objects without sacrificing quality. For example, if the data being transmitted to the media player device represents individually renderable 3D models for each object included within the virtual 3D space, a significant amount of additional data (e.g., approximately twice as much data) may be needed to represent a virtual 3D space with, for example, ten objects, as compared to the amount of data needed to represent a virtual 3D space with, for example, five objects. Thus, even if data representative of a virtual 3D space including models of five objects can be transmitted to a media player device in real time, this type of transmission may not be able to scale to similarly represent ten objects or one hundred objects or more within the virtual 3D space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
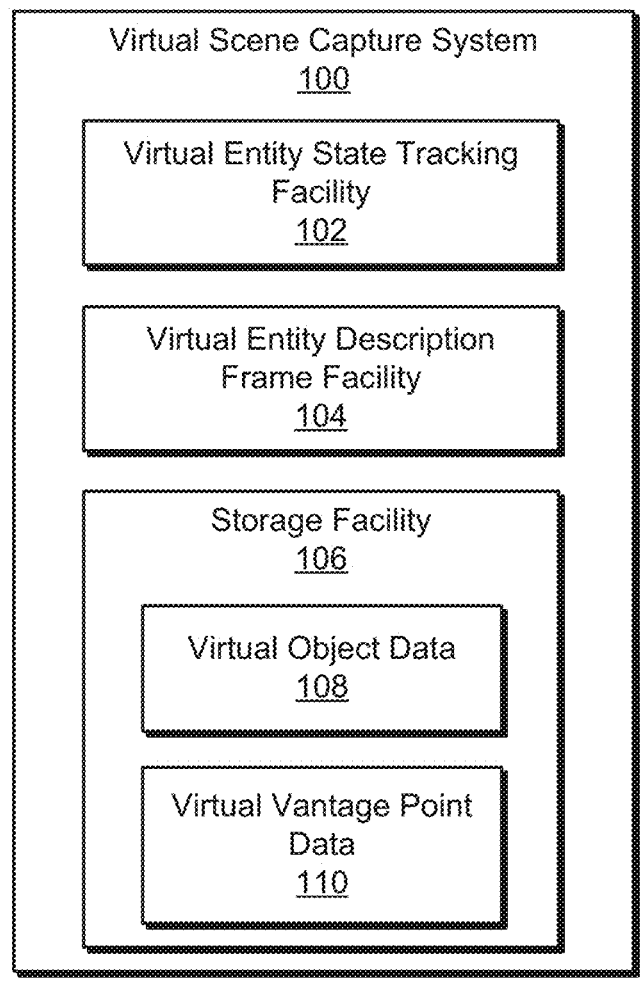
FIG. 1 illustrates an exemplary virtual scene capture system for rendering frames of a virtual scene from different vantage points based on a virtual entity description frame of the virtual scene according to principles described herein.

Methods and systems for rendering frames of a virtual scene from different vantage points based on a virtual entity description frame of the virtual scene are described herein. For example, a virtual scene capture system may maintain data representative of a plurality of virtual entities included within a virtual three-dimensional ("3D") space of a virtual scene. The plurality of virtual entities may include one or more virtual objects along with a plurality of virtual vantage points into the virtual 3D space (e.g., virtual locations, angles, viewpoints, etc., from which to view the one or more virtual objects included within the virtual 3D space). In particular, the plurality of virtual vantage points may include at least a first virtual vantage point and a second virtual vantage point different from the first virtual vantage point.

Based on the maintained data representative of the plurality of virtual entities, the virtual scene capture system may generate a virtual entity description frame representative of a state of at least one virtual entity in the plurality of virtual entities at a particular point in a temporal sequence. For example, the virtual entity description frame may be a key description frame that represents respective state information for all the virtual entities (i.e., virtual objects and virtual vantage points) included in the plurality of virtual entities, or may be an update description frame representing state information of only those virtual entities in the plurality of virtual entities that have changed since a previous key description frame was generated.

Upon generating the virtual entity description frame, the virtual scene capture system may provide the virtual entity description frame to a plurality of server-side 3D rendering engines associated with a content provider system to facilitate the 3D rendering engines in rendering frames of the virtual scene from different vantage points based on the virtual entity description frame. For instance, the virtual scene capture system may provide the virtual entity description frame to a first 3D rendering engine that is associated with the first virtual vantage point and is configured to render, based on the virtual entity description frame, a first surface data frame representative of color and depth data of surfaces of the virtual object visible from the first virtual vantage point at the particular point in the temporal sequence. Similarly, the virtual scene capture system may provide the virtual entity description frame to a second 3D rendering engine that is associated with the second virtual vantage point and is configured to render, also based on the virtual entity description frame, a second surface data frame representative of color and depth data of surfaces of the virtual object visible from the second virtual vantage point at the particular point in the temporal sequence.

The systems and methods for rendering frames of a virtual scene from different vantage points based on a virtual entity description frame of the virtual scene described herein may provide various advantages and benefits. For example, the systems and methods described herein may facilitate users in experiencing virtual 3D spaces of virtual scenes. As used herein, a "virtual 3D space" of a virtual scene may refer to a rendering (e.g., a wholly virtualized rendering) of an environment or a world (e.g., an immersive virtual reality world) that may be experienced by a user in a similar way as the user might experience the real world. For example, a user experiencing the virtual scene may be able to move about within the virtual 3D space and look at and/or otherwise interact with objects included within the virtual space. In some examples, a virtual 3D space may be wholly virtualized (e.g., computer generated) and rendered in a similar way as a real-world scene may be rendered. In other examples, a virtual 3D space may be based, at least in part, on one or more real-world objects captured from a real-world scene.

In any case, the systems and methods described herein may facilitate users in experiencing virtual 3D spaces of virtual scenes that are streamed, in their entirety, from a provider system such that data representative of the virtual 3D spaces and the virtual entities included therein do not need to be preloaded or stored on a media player device prior to the experiencing of the virtual 3D space by the user of the media player device. For example, all the data needed for a media player device to present a virtual scene may be streamed to the media player device (e.g., in real time in certain implementations) so that data representative of virtual scene content does not need to be downloaded, stored, or otherwise accessed (e.g., by way of a local physical disc) prior to the presentation of the virtual scene to the user.

Moreover, the systems and methods for rendering frames of a virtual scene from different vantage points based on a virtual entity description frame of the virtual scene described herein may facilitate providing virtual reality media content representative of the virtual scene to media player devices in such a way that the virtual reality media content may be rendered from arbitrary virtual locations and dynamically selected virtual vantage points within the virtual 3D space. Specifically, as will be described in more detail below, by rendering frames of a virtual scene from different vantage points (e.g., the virtual vantage points), the virtual scene capture system may include the frames in a data pipeline configured to allow a media player device to render, in three dimensions, a virtual 3D space from arbitrary and dynamically selectable virtual vantage points based on a plurality of two-dimensional ("2D") video streams included in the data pipeline and associated with, for example, relatively fixed vantage points (e.g., the virtual vantage points). As a result, the media player device may allow the user to experience the virtual 3D space as if moving around freely within the virtual 3D space based on 2D video streams carrying data representative of the virtual 3D space, rather than based on 3D model data representative of a variable and potentially unlimited number of 3D models associated with the virtual 3D space. For example, rather than providing data representative of 3D models of every virtual object included within the virtual 3D space, the data pipeline may provide 2D video data (e.g., color data and depth data) representative of all the virtual objects within the virtual 3D space from the virtual vantage points. As such, an unlimited number of objects may be represented in a rendering of the virtual scene without the media player device having to receive additional data or perform additional rendering work than would be required for rendering the virtual scene with only one or two objects, for example.

Additionally, by maintaining and providing all the data representative of the virtual scene to the media player devices without relying on preloaded content already stored at the media player devices, the system and methods described herein may allow virtual 3D spaces to be generated or modified (e.g., in real time) by the provider without having to modify preloaded data stored on the media player device. As a result, content creators responsible for generating a virtual scene or one or more users experiencing the virtual scene may provide commands to the virtual scene capture system to modify aspects of the virtual scene (e.g., to modify, replace, or remove virtual objects, etc.), and these modifications can be instantly reflected in the data being streamed to users such that the virtual scene is modified in real time or near real time.

Similarly, various operations that may be computationally expensive (e.g., prohibitively expensive for certain media player devices) may be performed by powerful computing resources associated with the virtual scene capture system, which may be operated by a virtual reality media provider and may be associated with much more powerful computing resources (e.g., large servers or the like) than, for example, the media player devices associated with users. For example, the virtual scene capture system may perform computationally expensive physics operations with respect to objects within a virtual scene, artificial intelligence operations with respect to the objects, and so forth. Because these operations are performed at the provider level, the media player devices operated by users may not need to be associated with particularly powerful computing resources, which conserves user device resources, provides convenience to users (e.g., in terms of portability, cooling, etc.), and enables various types of media player devices (e.g., with various form factors, various price points, etc.) to provide the experience of the virtual scene to users.

While certain examples described herein may reference a few specific articles from pluralities that may have any suitable numbers of the articles, it will be understood that the same principles described in accordance with the few specific articles may apply to one or more other articles in the pluralities, up to and including all of the articles in each respective plurality of articles. For instance, due to convenience and clarity of description, a few articles may be designated by ordinal adjectives such as "first," "second," and the like (e.g., first and second virtual vantage points, first and second 3D rendering engines, first and second surface data frames, etc.). However, as will generally be illustrated in the figures, principles described herein may apply to many or all of the articles included in a plurality of the articles, as opposed to just the first and second articles, for example. Thus, as will be described below, certain implementations may include many (i.e., more than two) 3D rendering engines rendering many surface data frames each associated with the view from one of many virtual vantage points, and so forth.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual scene capture system 100 ("system 100") for rendering frames of a virtual scene from different vantage points based on a virtual entity description frame of the virtual scene. As shown, system 100 may include, without limitation, a virtual entity state tracking facility 102, a virtual entity description frame facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple devices and/or multiple locations as may serve a particular implementation. Each of facilities 102 through 106 will now be described in more detail.

Virtual entity state tracking facility 102 may include one or more physical computing devices (e.g., hardware and/or software components such as processors, memories, communication interfaces, instructions stored in memory for execution by the processors, etc.) that perform various operations associated with rendering frames of a virtual scene from different vantage points based on a virtual entity description frame of the virtual scene. For example, using the one or more physical computing devices, virtual entity state tracking facility 102 may maintain data representative of a plurality of virtual entities included within a virtual 3D space of a virtual scene. Virtual entity state tracking facility 102 may maintain the data in any suitable way. For example, virtual entity state tracking facility 102 may receive, track, generate, analyze, organize, and/or otherwise process data representative of the plurality of virtual entities of the virtual scene. As will be described in more detail below, virtual entity state tracking facility 102 may also receive commands to modify the maintained data (e.g., to modify one or more of the virtual entities such as by adding, removing, replacing, moving, rotating, enlarging, or otherwise modifying the virtual entities) and may implement the commands by modifying the data being maintained. Virtual entity state tracking facility 102 may further maintain the data by interoperating with storage facility 106 to store data representative of each virtual entity in storage facility 106.

As used herein, a "virtual entity" may refer to any virtual item that may be associated with a virtual scene and/or a virtual 3D space. For example, among the virtual entities for which virtual entity state tracking facility 102 maintains data, the virtual 3D space of the virtual scene may include virtual entities such as one or more virtual objects, a plurality of virtual vantage points into the virtual 3D space (e.g., virtual capture devices positioned and angled in particular ways with respect to the virtual 3D space so as to capture the virtual 3D space from a variety of different perspectives), and/or any other virtual entities as may serve a particular implementation. In particular, as will be described and illustrated below, one exemplary virtual 3D space may include a virtual object surrounded by a plurality of virtual vantage points including a first virtual vantage point and a second virtual vantage point different from the first virtual vantage point.

Virtual entity description frame facility 104 may include one or more physical computing components (e.g., hardware and/or software components separate from those of virtual entity state tracking facility 102 or shared with virtual entity state tracking facility 102) that perform various operations associated with generating and/or providing virtual entity description frames to be used for rendering frames of the virtual scene from the plurality of vantage points including the first and second virtual vantage points. For example, using the one or more physical computing devices, virtual entity description frame facility 104 may generate (e.g., based on the data representative of the plurality of virtual entities maintained by virtual entity state tracking facility 102) a virtual entity description frame representative of a state of at least one virtual entity (e.g., and, in some examples, all of the virtual entities) in the plurality of virtual entities at a particular point in a temporal sequence (e.g., a particular moment in real time, a particular point representing a moment on a virtual timeline unrelated to real time, etc.).

As used herein, a "virtual entity description frame" may refer to a dataset (e.g., including object description data represented in a language such as Java Script Object Notation ("JSON") or the like) that describes a state of one or more virtual entities included in a virtual 3D space of a virtual scene. For example, a virtual entity description frame may include data describing each of several virtual entities included in the virtual 3D space at a particular point in a temporal sequence. For instance, the virtual entity description frame may include state data representative of a location where each virtual entity is positioned with respect to a global coordinate system associated with the virtual 3D space, angles and orientations at which each virtual entity is positioned, relative sizes of each virtual entity, one or more movement vectors for each virtual entity, colors and/or textures for various surfaces of each virtual entity, and/or any other state data that may be used to describe particular virtual entities at the particular point in the temporal sequence as may serve a particular implementation. Exemplary virtual entity description frames will be described in more detail below.

Once virtual entity description frame facility 104 has generated the virtual entity description frame, virtual entity description frame facility 104 may provide the virtual entity description frame to a plurality of server-side 3D rendering engines associated with a content provider system. As used herein, "server-side" may refer to a server side (e.g., a provider's side) of a server-client transaction such as a transaction where a content provider system provides content (e.g., virtual reality media content) to a client device used by an end user. For example, as will be described in more detail below, a virtual reality media content provider system may provide virtual reality media content to a media player device associated with a user. As such, server-side systems and components may refer to those systems and components that are associated with (e.g., included within, implemented by, interoperate with, etc.) the content provider system to provide data (e.g., virtual reality media content) to the media player device (e.g., by way of a network). In contrast, "client-side" devices may be associated with the client device (e.g., the media player device) used by the user on the other side of the network, and may include devices that facilitate the client device with receiving the data from the content provider system (e.g., the media player device and/or other computer components operated by the user on the user's side of the network).

Accordingly, 3D rendering engines may be implemented on the server side of the network (i.e., associated with system 100 and/or other elements of a content provider system) by hardware and/or software resources that may be integrated with or separate from and communicatively coupled to the hardware and/or software resources of system 100. The 3D rendering engines may be configured to render, based on a virtual entity description frame, respective surface data frames associated with particular virtual vantage points. For example, virtual entity description frame facility 104 may provide the virtual entity description frame to a first 3D rendering engine associated with the first virtual vantage point and configured to render (e.g., based on the virtual entity description frame) a first surface data frame representative of color and depth data of surfaces of a virtual object visible from the first virtual vantage point at the particular point in the temporal sequence. Additionally, virtual entity description frame facility 104 may provide the same virtual entity description frame to a second 3D rendering engine associated with the second virtual vantage point and configured to render (e.g., also based on the virtual entity description frame) a second surface data frame representative of color and depth data of surfaces of the virtual object visible from the second virtual vantage point at the particular point in the temporal sequence.

As used herein, a "surface data frame" may refer to a dataset that represents various types of data associated with surfaces of objects (e.g., virtual objects) visible within a virtual scene from a particular vantage point and at a particular point in a temporal sequence associated with the virtual scene. For example, a surface data frame may include color data (i.e., image data) as well as depth data representative of the objects as viewed from a particular vantage point with respect to the virtual scene. As such, a plurality of related surface data frames may be sequenced together to create a video-like representation (representing not only color but also depth data) of the virtual scene as the virtual scene would be viewed or experienced from the particular vantage point. In certain examples, a surface data frame may further be associated with other types of data such as audio data, metadata (e.g., metadata including information about specific objects represented in the surface data frame and/or information about vantage points associated with the virtual scene), and/or other types of data as may serve a particular implementation. Examples of surface data frames associated with different vantage points, as well as sequences of related surface data frames will be described and illustrated below.

As used herein, "color data" may broadly include any image data, video data, or the like, whether represented in color or grayscale (i.e., "black and white"), that represents how a subject (e.g., a virtual object included within a virtual 3D space of a virtual scene) may appear at a particular point in a temporal sequence or over a particular time period from the perspective of a particular vantage point. Color data is not limited to any particular format, file type, frame rate, resolution, quality level, or other characteristic that may be associated with various definitions and/or standards defining image data and/or video data in the art. Similarly, as used herein, "depth data" may include any data representative of a position of a subject in space. For example, depth data representative of a virtual object may include coordinates with respect to a global coordinate system (e.g., a global coordinate system associated with the virtual 3D space of the virtual scene) for different points on the surfaces of the virtual object.

Storage facility 106 may maintain any suitable data received, generated, managed, tracked, maintained, used, and/or transmitted by facilities 102 or 104 in a particular implementation. For example, as shown, storage facility 106 may include virtual object data 108, which may include data (e.g., state data) associated with one or more virtual objects included within a virtual 3D space of a virtual scene, as well as virtual vantage point data 110, which may include data (e.g., state data) associated with one or more virtual vantage points into the virtual 3D space. Additionally, storage facility 106 may include data associated with other types of virtual entities included within the virtual 3D space of the virtual scene, instructions (e.g., programming instructions) for performing the operations described herein, and/or any other data as may facilitate facilities 102 and 104 in performing the operations described herein. For example, storage facility 106 may further include data (e.g., object description data, color data, depth data, audio data, metadata, etc.) associated with surface data frames, virtual entity description frames, and the like. Storage facility 106 may also maintain additional or alternative data as may serve a particular implementation.

In certain examples, system 100 may be associated with various other server-side systems (e.g., virtual scene control systems, asset storage systems, video data packaging systems, 3D rendering engines, etc.) included together in various configurations within a content provider system (e.g., a virtual reality media content provider system) in order to render surface data frames of a virtual scene from different vantage points and to provide the surface data frames (e.g., as part of virtual reality media content) to be presented to a user to allow the user to experience the virtual scene.

In some implementations, it will be understood that one or more of these other server-side systems may be integrated with (e.g., included within) system 100 or otherwise closely associated with system 100 (e.g., communicatively coupled to system 100, operated by the same or related virtual reality media provider entities, etc.). For example, in a particular implementation, system 100 may include an asset storage system storing color and depth data representative of one or more virtual objects, a plurality of 3D rendering engines communicatively coupled to the asset storage system, and a virtual entity state tracking system communicatively coupled to the asset storage system and/or to the 3D rendering engines. The entity state tracking system may be configured to perform one or more of the operations described above in relation to facilities 102 through 106. In other implementations, system 100 may be implemented as a separate, standalone system that is not integrated with these other server-side systems but, rather, is communicatively coupled to the other server-side systems and/or otherwise configured to interoperate with the other server-side systems as may serve a particular implementation.

Figure 2:
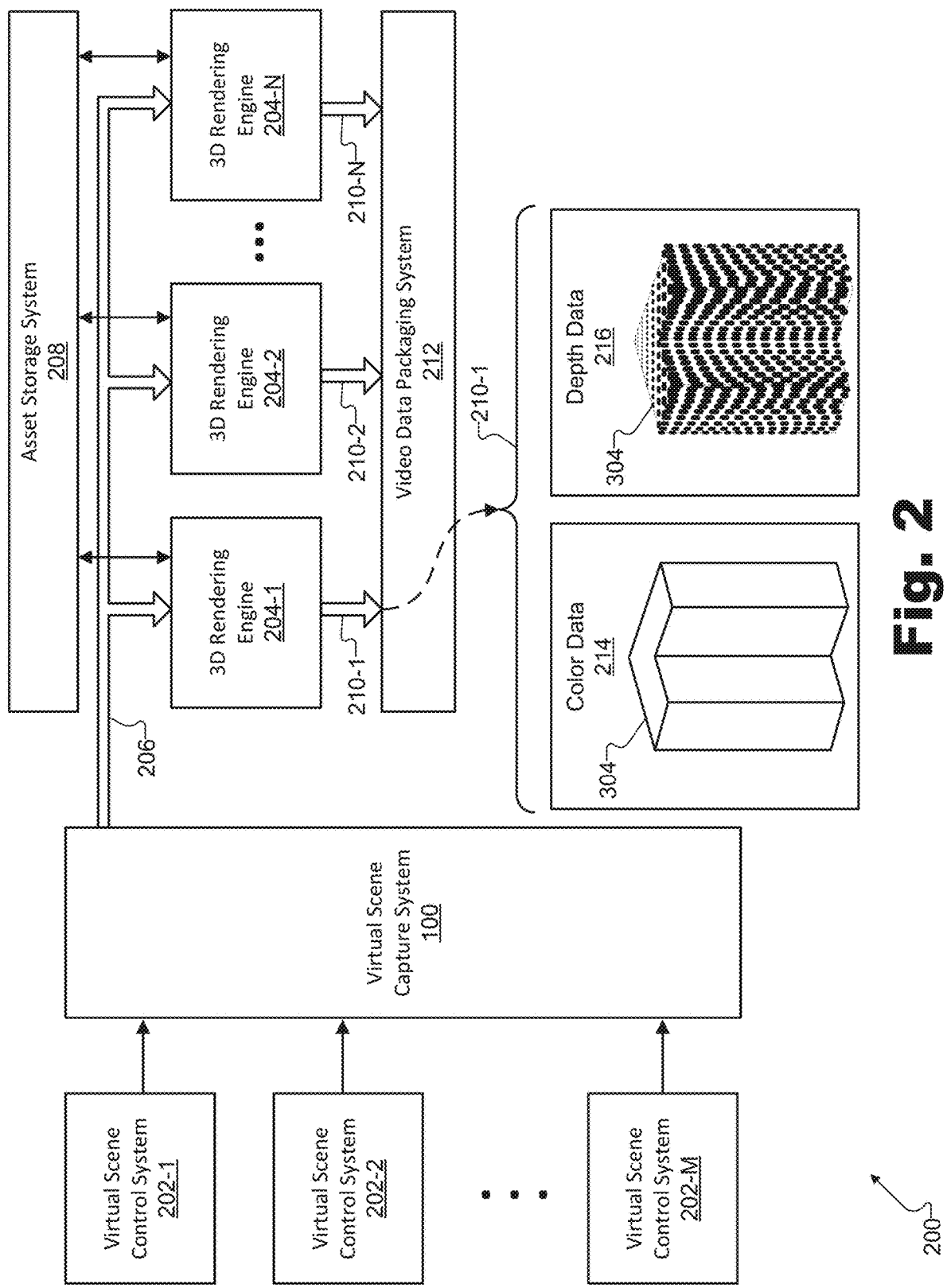
FIG. 2 illustrates an exemplary configuration in which the virtual scene capture system of FIG. 1 facilitates rendering frames of a virtual scene from different vantage points based on a virtual entity description frame of the virtual scene according to principles described herein.

By way of illustration, FIG. 2 shows an exemplary configuration 200 in which system 100 facilitates rendering frames of a virtual scene from different vantage points based on a virtual entity description frame of the virtual scene. As shown in FIG. 2, an implementation of system 100 may be communicatively coupled to a plurality of virtual scene control systems 202 (e.g., virtual scene control systems 202-1 through 202-M) as well as to a plurality of server-side 3D rendering engines 204 (e.g., 3D rendering engines 204-1 through 204-N). For example, system 100 may be communicatively coupled to virtual scene control systems 202 and/or to 3D rendering engines 204 by way of one or more networks (e.g., including any of the networks or network technologies described herein) or by way of other modes of communication as may serve a particular implementation. As shown in configuration 200, a virtual entity state tracking system that performs the operations described above in relation to facilities 102 through 106 may be implemented by system 100. As mentioned above, in other implementations, system 100 may embody both an entity tracking system configured to perform these operations and one or more of the other systems and devices illustrated in configuration 200.

System 100 may provide, via the communicative connection with 3D rendering engines 204, one or more virtual entity description frames including a virtual entity description frame 206. Based on virtual entity description frame 206 as well as data requested and received from an asset storage system 208 that is communicatively coupled with 3D rendering engines 204, 3D rendering engines 204 may each render respective surface data frames 210 (e.g., surface data frames 210-1 through 210-N) and may provide surface data frames 210 to a video data packaging system 212. System 100 has been described in detail above with respect to FIG. 1. Each of the other systems and items illustrated in configuration 200 will now be described in more detail.

Virtual scene control systems 202 may represent any computing systems configured to request and/or otherwise implement changes to one or more virtual entities included in a virtual 3D space of a virtual scene (e.g., virtual entities about which data is maintained by system 100). For example, one or more virtual scene control systems 202 (e.g., virtual scene control system 202-1) may be associated with (e.g., maintained by, operated by, etc.) a content creator responsible for originally generating the data representative of the virtual entities included within the virtual 3D space of the virtual scene. Additionally, in certain implementations, one or more other virtual scene control systems 202 (e.g., virtual scene control system 202-2) may be associated with an end user that is experiencing the virtual 3D space of the virtual scene. For example, virtual scene control system 202-2 may be implemented by a media player device currently rendering the virtual entities to allow a user of the media player device to experience and interact with the virtual entities within the virtual 3D space of the virtual scene.

Because system 100 may maintain one unified set of data representative of all the virtual entities included within the virtual 3D space (e.g., as opposed to separate sets of data representative of the virtual entities for each virtual scene control system 202), as each of virtual scene control systems 202 makes modifications to the virtual entities, those modifications may be reflected in the unified set of data. Accordingly, multiple users (i.e., different users associated with different virtual scene control systems 202) may all effect modifications to the same virtual 3D space of the same virtual scene. As a result, the modifications made by all of virtual scene control systems 202 may be reflected in virtual entity description frames output by system 100 (e.g., virtual entity description frame 206), and may, in turn, be reflected in each of the surface data frames rendered by 3D rendering engines 204 (e.g., surface data frames 210).

Figure 3:
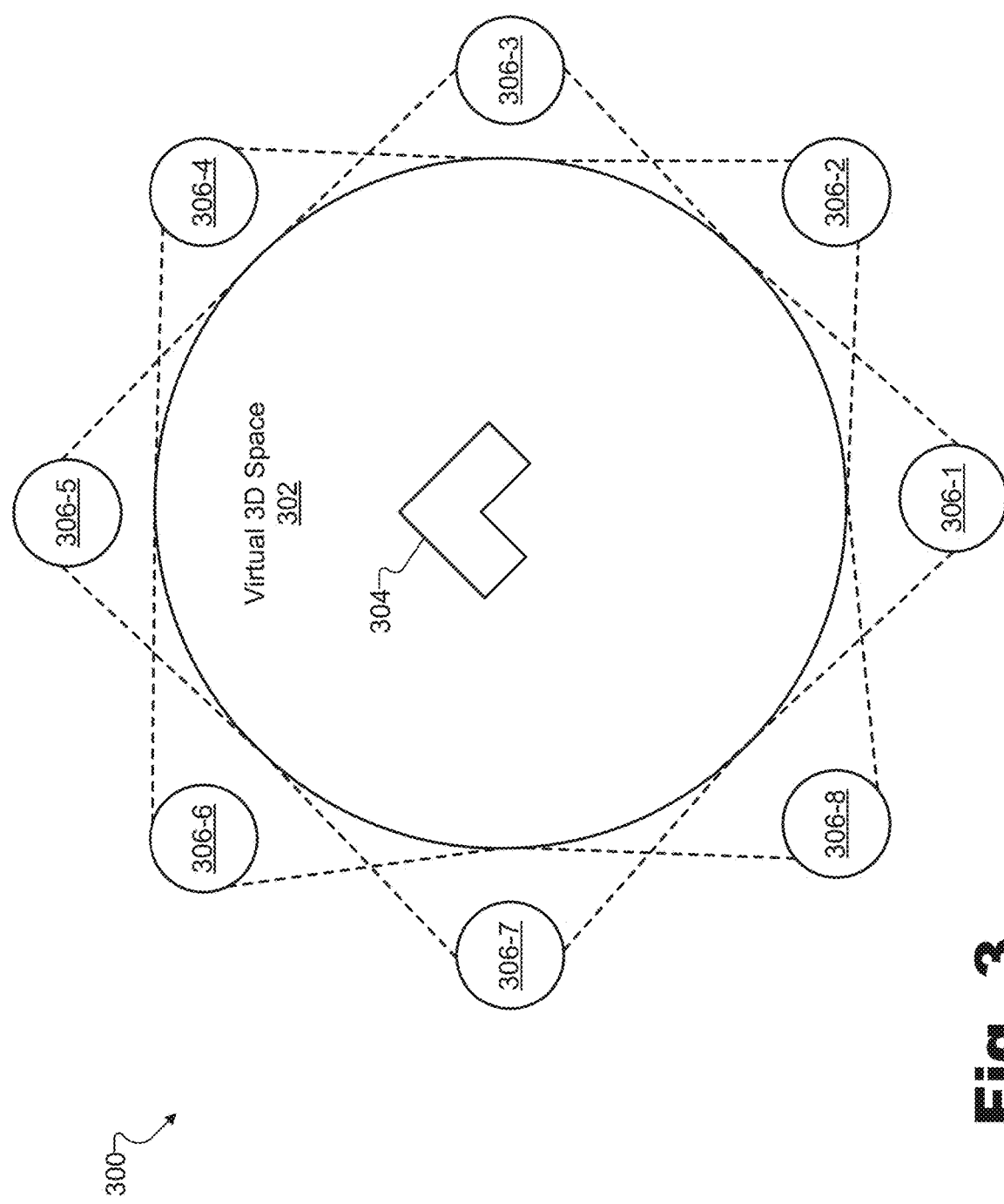
FIG. 3 illustrates an exemplary virtual scene including a plurality of virtual entities according to principles described herein.
Figure 4:
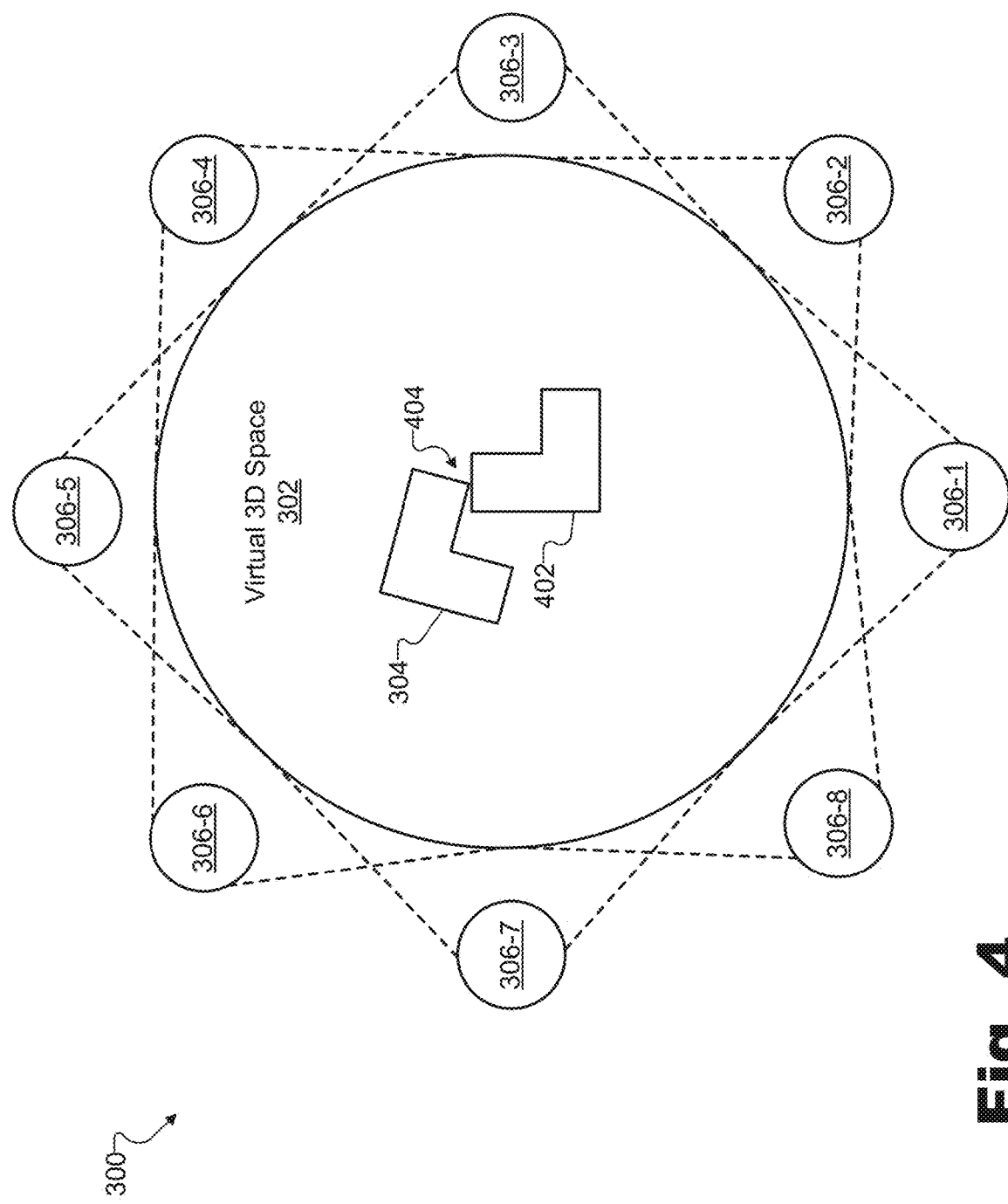
FIG. 4 illustrates exemplary modifications that may be made to the virtual scene of FIG. 3 according to principles described herein.

To illustrate how virtual scene control systems 202 may modify the virtual entities in a virtual 3D space, FIG. 3 shows an exemplary virtual scene 300 including a plurality of virtual entities, and FIG. 4 illustrates exemplary modifications that may be made to virtual scene 300. Specifically, referring first to FIG. 3, virtual scene 300 is associated with a virtual 3D space 302 that includes a virtual object 304 and is surrounded by a plurality of virtual vantage points 306 (e.g., virtual vantage points 306-1 through 306-8).

Virtual scene 300 may represent any type of scene (e.g., a real-world scene, a computer-generated scene, an event, etc.) as may serve a particular implementation. As illustrated by the circle, the virtual 3D space 302 associated with virtual scene 300 may be a specifically delineated area such as a stage, an arena, or the like. Conversely, in other examples, virtual 3D space 302 may not be so well defined or delineated. For example, virtual 3D space 302 may represent any indoor or outdoor location (e.g., based on the real world or based on an imaginary or computer-generated world), event, landscape, structure, or the like.

Virtual object 304 may represent any virtual object, whether living or inanimate, that is associated with (e.g., located within or around) virtual 3D space 302 and that is detectable (e.g., viewable, etc.) from at least one of virtual vantage points 306. For example, virtual object 304 may be based on a real-world object (e.g., an object for which a 3D model has been generated), an imaginary or computer-generated object, or the like. While virtual object 304 is drawn as a relatively simple geometric shape for the sake of clarity, it will be understood that virtual object 304 may represent various types of objects having various levels of complexity. Rather than a geometric shape, for instance, virtual object 304 could represent any animate or inanimate object or surface, such as a person or another living thing, a non-transparent solid, liquid, or gas, a less discrete object such as a wall, a ceiling, or a floor, or any other type of object described herein or as may serve a particular implementation. As shown, virtual object 304 may include various surfaces such that virtual object 304 may look different when viewed from each different virtual vantage point 306, as will be illustrated below.

Along with virtual object 304, virtual scene 300 also includes virtual vantage points 306 into virtual 3D space 302. As used herein, a virtual vantage point "into" a virtual 3D space may refer to a virtual vantage point that is positioned, angled, oriented, etc., with respect to the virtual 3D space in any suitable way. For example, a virtual vantage point into a virtual 3D space may be a virtual vantage point that is included within the virtual 3D space, is outside of the virtual 3D space with a perspective looking into the virtual 3D space, is surrounding the virtual 3D space along with other virtual vantage points, and/or is otherwise associated with the virtual 3D space in any suitable way so as to provide a view of at least some portion of the virtual 3D space.

As shown, each virtual vantage point 306 may be represented in FIG. 3 with a labeled circle disposed at a particular location with respect to virtual 3D space 302 and that has dotted lines emanating therefrom to illustrate a field of view associated with the virtual vantage point 306. The positions associated with virtual vantage points 306 may be fixed with respect to virtual 3D space 302, although, as will be described below, it may be possible for the fixed positions to be modified by one of virtual scene control systems 202. Additionally, in some examples, it will be understood that both virtual 3D space 302 and virtual vantage points 306 may be moving through virtual scene 300 together (e.g., such as a vehicular virtual 3D space like a spaceship, a hot air balloon, or the like). As shown, the fixed positions at which virtual vantage points 306 are disposed may, in some examples, surround virtual 3D space 302 along at least two dimensions associated with virtual 3D space 302 (e.g., along a plane such as the ground). In other examples, positions 306 may further surround virtual 3D space 302 along three dimensions (e.g., by including positions 306 above and below 302 as well). Even in examples where virtual vantage points 306 surround virtual 3D space 302 along only two dimensions, pluralities of virtual vantage points 306 may be "stacked" at different heights relative to the positions encircling virtual 3D space 302 shown in FIG. 3 in order to view virtual object 304 from related but slightly different perspectives.

While each of virtual vantage points 306 illustrated in FIG. 3 are angled inwardly toward virtual 3D space 302 so as to capture virtual 3D space 302 from various angles to enable virtual 3D space 302 to later be rendered from arbitrary virtual vantage points, it will be understood that, in certain examples, one or more of virtual vantage points 306 may be angled outwardly (i.e., away from virtual 3D space 302) to view virtual objects surrounding virtual 3D space 302 or the like. For instance, a 360-degree virtual vantage point may be positioned in the middle of virtual 3D space 302 (not explicitly shown) to provide data representative of virtual objects included within virtual 3D space 302 from additional perspectives and/or data representative of virtual objects outside of virtual 3D space 302.

As mentioned above, FIG. 4 illustrates exemplary modifications that may be made to virtual scene 300. Specifically, in some examples, system 100 may receive a command to modify the maintained data representative of the plurality of entities (i.e., data representative of virtual object 304, virtual vantage points 306, and/or any other virtual entities included in virtual 3D space 302), and, in response to the receiving of the command, may modify the maintained data representative of the plurality of virtual entities in accordance with the command. For example, the command may be sent (e.g., by way of a web socket or another suitable type of communication) by any of virtual scene control systems 202 using JSON code or another suitable object description code describing the modification that is to be made.

The virtual entities included within virtual scene 300 may be modified in any suitable manner, which may be determined in part by the type of the virtual entity being modified. For example, if the virtual entity being modified is a virtual object, the modifying of the maintained data representative of the plurality of virtual entities in accordance with the command may include adding an additional virtual object to the plurality of virtual entities. Additionally or alternatively, the modifying may include replacing the virtual object included within the plurality of virtual entities with an additional virtual object, removing the virtual object from the plurality of virtual entities, modifying at least one property of a virtual object included in the plurality of virtual entities, and/or otherwise modifying the virtual object with respect to other virtual entities and/or with respect to the virtual 3D space of the virtual scene.

To illustrate, FIG. 4 shows an additional virtual object 402 that is added to virtual 3D space 302 along with virtual object 304. It will be understood that in other examples, virtual object 402 could instead replace virtual object 304 (i.e., such that virtual object 304 is removed from virtual 3D space 302 while virtual object 402 is added to virtual 3D space 302). As further shown in FIG. 4, certain properties of virtual object 304 (e.g., the position and orientation of virtual object 304) may be modified. In other examples, other properties such as the size, color, texture, posture, and/or any other properties of virtual object 304 could similarly be modified.

If the virtual entity being modified is a virtual vantage point (e.g., one of virtual vantage points 306), the modifying of the maintained data representative of the plurality of virtual entities in accordance with the command may include adding an additional virtual vantage point to the plurality of virtual entities. Additionally or alternatively, the modifying may include modifying at least one of the plurality of virtual vantage points included within the plurality of virtual entities, removing at least one of the plurality of virtual vantage points from the plurality of virtual entities, or the like. For example, a field of view associated with one of virtual vantage points 306 (e.g., virtual vantage point 306-1) may be changed or turned to get a perspective on a different angle of virtual 3D space 302. In other examples, virtual vantage points 306 may be moved inward or outward (e.g., to create a zoomed in or zoomed out effect with respect to a particular virtual object within virtual 3D space 302), removed from the plurality of virtual vantage points 306, or otherwise modified. As another example, an additional virtual vantage point may be added to the plurality of virtual vantage points 306 to get another perspective on virtual objects 304 and 402 (e.g., a perspective that is not well covered by one of virtual vantage points 306-1 through 306-8).

As described above, in some examples, a virtual object such as virtual object 304 may be modified (e.g., moved and/or rotated with respect to virtual 3D space 302) based on a direct command from one of virtual scene control systems 202 to modify the virtual object. In other examples, however, a virtual object may be modified automatically (i.e., modified in the same or different ways but without being based on an explicit command from a virtual scene control system 202) based on interactions with other virtual entities included within virtual 3D space 302. More specifically, for example, the maintaining by system 100 of the data representative of the plurality of virtual entities may include applying (e.g., to the virtual objects included within the virtual 3D space of the virtual scene) at least one of a physics-based object behavior and an artificial intelligence-based (AI-based) object behavior.

For instance, a physics-based object behavior 404 is illustrated in FIG. 4. When a modification to add virtual object 402 to virtual 3D space 302 is made (e.g., by system 100), system 100 may determine that virtual objects 304 and 402 each represent solid virtual objects that cannot exist in the same virtual space. Accordingly, as illustrated by physics-based object behavior 404, locational and orientational properties of virtual object 304 may be modified in accordance with physics rules such that virtual object 402 partially displaces virtual object 304 (i.e., "bumps" virtual object 304 out of the way). Other physics-based object behaviors may mimic other rules of physics (e.g., real-world physics or imaginary physics that apply only in the virtual world) that define how objects interact with one another and with physical forces and principles (e.g., gravity, momentum, friction, buoyancy, light reflection, etc.). These physics-based object behaviors may also be applied to the maintained data representative of virtual objects included within virtual 3D space 302 by system 100. Moreover, AI-based object behaviors may also help define how virtual objects interact with one another and with the environment in which the virtual objects are placed. For example, AI-based object behaviors may be particularly applicable with virtual objects (e.g., avatars) representing living things such as people and/or animals who may use artificial intelligence to make "choices" such as where to walk within virtual 3D space 302, who to talk to and what to say, when to run from danger, and so forth.

Returning to FIG. 2, system 100 generates virtual entity description frames representative of the states of the virtual entities in the plurality of virtual entities at particular points in a temporal sequence (e.g., a real time sequence, a virtual timeline associated with time in a virtual world, etc.). For example, as shown, system 100 may generate a particular virtual entity description frame (i.e., virtual entity description frame 206), and may provide virtual entity description frame 206 to each of 3D rendering engines 204. 3D rendering engines 204 may be server-side 3D rendering engines (e.g., 3D rendering engines across a network and/or otherwise separated from client-side devices such as media player devices used by users). In some examples, 3D rendering engines 204 may be implemented by separate devices (e.g., separate servers, separate processors within a server, etc.) or by separate software processes (e.g., separate instruction threads, etc.), while in other examples, 3D rendering engines 204 may be integrated together into common hardware and/or software devices or processes as may serve a particular implementation. In some implementations, 3D rendering engines may be jointly operated with or even fully integrated into a virtual scene capture system such as system 100, while in other implementations 3D rendering engines may be operated separately (e.g., by a different entity providing cloud-based processing services or the like).

Certain virtual entity description frames provided to 3D rendering engines 204 may be key description frames that include state data representative of all the virtual entities associated with the virtual scene (i.e., virtual scene 300) at a particular point in the temporal sequence, while other virtual entity description frames may be update description frames representative of a state (e.g., at a particular point in the temporal sequence) of change of only those virtual entities associated with the virtual scene that have been modified since a previous key description frame was generated representing the state of all the virtual entities at a previous point in the temporal sequence. For example, referring to the modifications illustrated in FIG. 4, a key description frame may include state data associated with virtual objects 304 and 402, as well as state data associated with virtual vantage points 306. In contrast, an update description frame may include only state data associated with virtual objects 304 and 402 or only state data associated with changes to virtual objects 304 and 402, because, for example, virtual objects 304 and 402 may have been modified since a previous key description frame was generated. Data representative of the state of virtual vantage points 306 may not be represented in this exemplary update description frame because virtual vantage points 306 may have remained statically positioned and unchanged since the previous key description frame.

Figure 5:
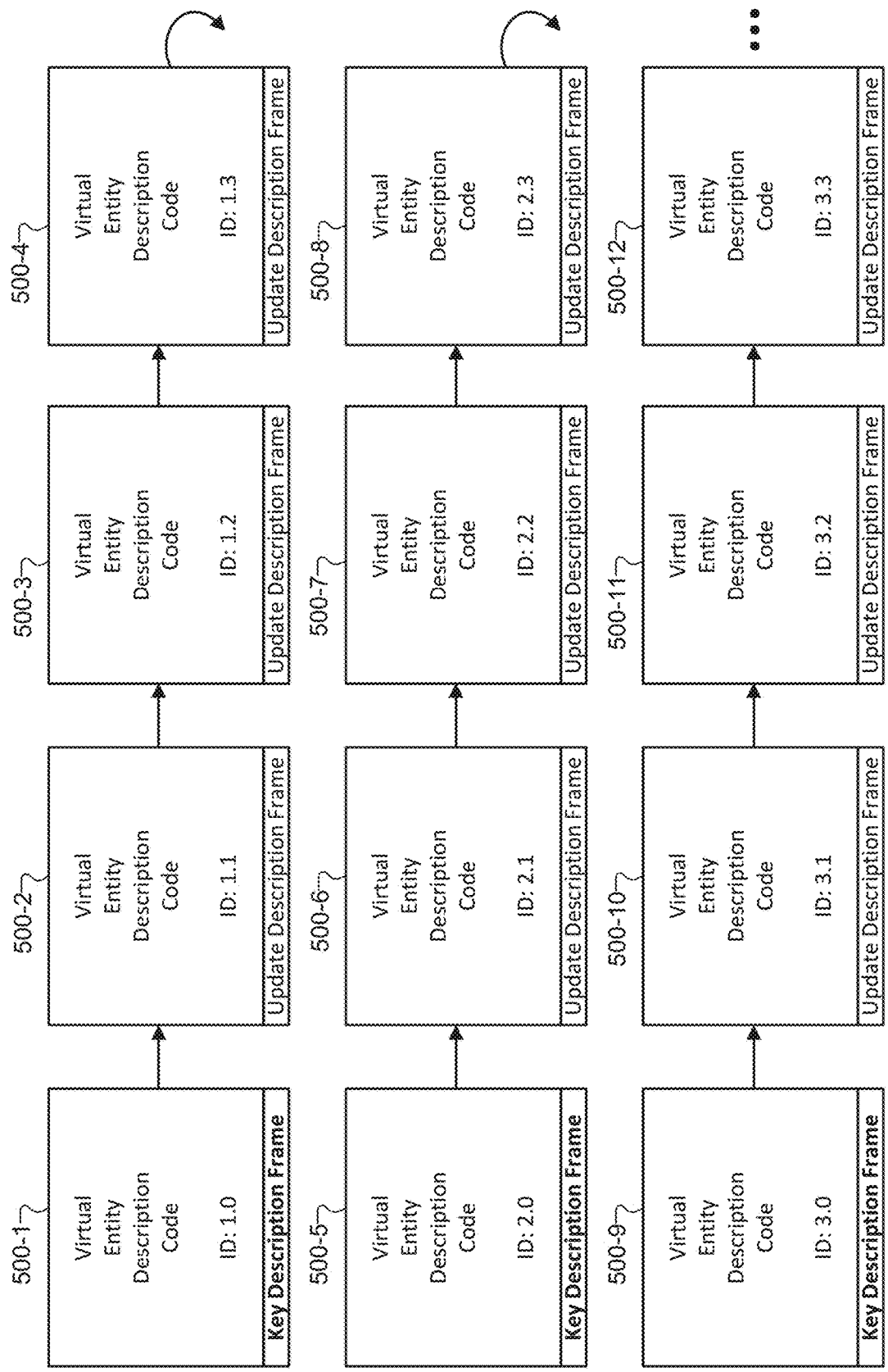
FIG. 5 illustrates exemplary virtual entity description frames that may be generated by the virtual scene capture system of FIG. 1 according to principles described herein.

FIG. 5 shows a plurality of exemplary virtual entity description frames 500 (e.g., virtual entity description frames 500-1 through 500-12) that may be generated by system 100. As indicated by arrows pointing from one virtual entity description frame 500 to another, virtual entity description frames 500 may be ordered in a temporal sequence starting with virtual entity description frame 500-1 and progressing to virtual entity description frame 500-12, after which the temporal sequence may progress to additional virtual entity description frames 500 that are not explicitly shown in FIG. 5. Along the bottom of each virtual entity description frame 500, the type of virtual entity description frame (e.g., key description frame or update description frame) is indicated. Specifically, virtual entity description frames 500-1, 500-5, and 500-9 are indicated as being key description frames, while virtual entity description frames 500-2 through 500-4, 500-6 through 500-8, and 500-10 through 500-12 are indicated as being update description frames.

Accordingly, in this example, each key description frame is followed in the temporal sequence by several (e.g., three) update description frames, which are in turn followed in the temporal sequence by another key description frame. It will be understood, however, that the arrangement of key description frames and update description frames shown in FIG. 5 is exemplary only, and that the arrangement of key and update description frames may be implemented in any way as may serve a particular implementation. For example, a virtual scene that is not particularly dynamic (i.e., is not affected by a large number of modifications to virtual entities) may be represented by relatively few key description frames followed by relatively large numbers of update description frames. Conversely, a virtual scene that is more dynamic may be represented by a larger proportion of key description frames (up to and including exclusively key description frames) and a smaller proportion of update description frames (down to and including no update description frames).

As further shown in FIG. 5, each virtual entity description frame 500 may include or be implemented by virtual entity description code (e.g., JSON code, XML code, or another type of code suitable for describing state data associated with the virtual entities maintained by system 100) and may be associated with a sequence number (e.g., an identification number or "ID") indicative of a position of the respective virtual entity description frame 500 in the temporal sequence with respect to other virtual entity description frames 500. For example, as shown, virtual entity description frame 500-1 may have a sequence number that is a whole number (i.e., "1.0") to indicate that virtual entity description frame 500-1 is a key description frame and to indicate the relative position of the frame with respect to other key description frames (e.g., "1.0" comes before "2.0"). Virtual entity description frames 500-2 through 500-4 may then each be associated with sequence numbers that begin with a 1 (i.e., to indicate that these frames are updates to key description frame 1.0) and include sub-identifiers (i.e., "0.1," "0.2," and "0.3") to indicate the relative positions of the update description frames in the temporal sequence with respect to other update description frames (e.g., "1.1" comes before "1.2"). This virtual entity description frame numbering scheme is exemplary only and any suitable frame numbering scheme may be employed as may serve a particular implementation.

Returning to FIG. 2, regardless of whether virtual entity description frame 206 is a key description frame (e.g., such as virtual entity description frames 500-1, 500-5, or 500-9) or an update description frame (e.g., such as the other virtual entity description frames 500 in FIG. 5), the sequence of virtual entity description frames including virtual entity description frame 206 may provide all the information needed by 3D rendering engines 204 to render virtual 3D space 302 of virtual scene 300 from the respective vantage points with which each 3D rendering engine 204 is associated. As such, it may not be necessary that 3D rendering engines 204 receive or process virtual entity description frames in order. Rather, 3D rendering engines 204 may render respective surface data frames 210 (e.g., which may each be generated from a single virtual entity description frame in the sequence) in any order as may be convenient or efficient for a particular 3D rendering engine 204, and the surface data frames 210 may be reordered and synchronized later (e.g., by video data packaging system 212).

In some examples, virtual entity description frame 206 may include state information representative of the virtual entities along with links to detailed information (e.g., binary data representative of virtual object geometries, textures, etc.) that is stored in asset storage system 208 and may be accessed, based on the links in virtual entity description frame 206, from asset storage system 208 by each of 3D rendering engines 204 as needed. Asset storage system 208 may be implemented by a separate device from system 100 and/or 3D rendering engines 204 (e.g., a separate server, a separate processor and storage facility within a server, etc.), by separate software processes (e.g., separate instruction threads, etc.), or may be integrated together into common hardware and/or software devices or processes with system 100 and/or 3D rendering engines 204 as may serve a particular implementation. In some implementations, asset storage system 208 may be jointly operated with or fully integrated into a virtual scene capture system such as system 100 and/or into a system that also includes 3D rendering engines 204, while in other implementations asset storage system 208 may be operated separately (e.g., by a different entity providing cloud-based processing services or the like).

In any case, between data included within virtual entity description frame 206 and data accessed from asset storage system 208 using links provided within virtual entity description frame 206, 3D rendering engines 204 may be receive access to all the information necessary to render surface data frames 210 representing virtual 3D space 302 from respective virtual vantage points without having to rely on information maintained locally by 3D rendering engines 204.

Each 3D rendering engine 204 may be associated with one of the virtual vantage points represented in the plurality of virtual entities maintained by system 100. For example, 3D rendering engines 204-1 through 204-8 (of which only 3D rendering engines 204-1 and 204-2 are explicitly shown in FIG. 2) may be associated with virtual vantage points 306-1 through 306-8 (illustrated in FIG. 3), respectively. As such, each 3D rendering engine 204 may render a respective surface data frame 210 as seen from the perspective (i.e., the position, angle, field of view, etc.) of the virtual vantage point 306 with which the particular 3D rendering engine 204 is associated. Moreover, as described above, each surface data frame 210 may include not only color data (i.e., image data) representative of the appearance of virtual objects from a respective virtual vantage point, but may also include depth data.

To illustrate, FIG. 2 shows images representative of surface data frame 210-1, which may be a surface data frame rendered by 3D rendering engine 204-1, the 3D rendering engine associated with virtual vantage point 306-1 (see FIG. 3). As shown, surface data frame 210-1 may include color data 214, which may represent a view of virtual 3D space 302 (including color data from the surfaces of virtual object 304) visible from virtual vantage point 306-1. While color data 214 is illustrated as an image in FIG. 2, it will be understood that color data 214 may be captured, encoded, formatted, transmitted, and represented in any suitable form. For example, color data may be digital data that is formatted according to a standard video encoding protocol, a standard image format, or the like. Color data 214 may represent a color image (e.g., similar to a color photograph) of the virtual objects included within virtual 3D space 302 as viewed from virtual vantage point 306-1. Additionally or alternatively, color data 214 may be a grayscale image representative of the virtual objects (e.g., similar to a black and white photograph).

Additionally, surface data frame 210-1 may include depth data 216, which may represent another view of virtual 3D space 302 that includes depth data for the surfaces of virtual object 304 from a point in space associated with virtual vantage point 306-1. Like color data 214, depth data 216 may depict virtual object 304 within virtual 3D space 302 from the perspective of virtual vantage point 306-1. However, rather than representing the visible appearance of virtual object 304 (i.e., representing in color or grayscale how light interacts with the surfaces of virtual object 304), depth data 216 may represent the depth (i.e., the distance or position) of each point on the surface of virtual object 304 (e.g., as well as other objects within virtual 3D space 302) relative to the virtual position of virtual vantage point 306-1. As with color data 214, depth data 216 may be captured, encoded, formatted, transmitted, and represented in any suitable form. For example, as shown, depth data 216 may be represented by grayscale image data (e.g., six or eight bits for each pixel represented within depth data 216). However, rather than representing how visible light reflects from the surfaces of virtual object 304 (i.e., as represented in color data 214), the grayscale image of depth data 216 may represent, for each pixel in the image, how far away the point represented by that pixel is from virtual vantage point 306-1. For example, points that are closer to virtual vantage point 306-1 may be represented with values that represent darker shades of gray (e.g., binary values closer to 0b111111 in the case of a six-bit implementation where 0b111111 represents black). Conversely, points that are farther away from virtual vantage point 306-1 may be represented with values that represent lighter shades of gray (e.g., binary values closer to 0b000000 in the case of the six-bit implementation where 0b000000 represents white).

Respective sets of surface data frames 210 may be generated by 3D rendering engines 204 such that each virtual entity description frame provided by system 100 (e.g., including virtual entity description frame 206) is associated with a respective set of surface data frames (e.g., a set that includes surface data frames 210-1 through 210-N) representing renderings of virtual 3D space 302 of virtual scene 300 from different virtual vantage points into virtual 3D space 302. As shown in FIG. 2, each surface data frame 210 in the respective sets of surface data frames may then be provided to video data packaging system 212, which may organize, synchronize, encode, compress, combine, and/or otherwise process the surface data frames to generate respective color video data streams and depth video data streams associated with each virtual vantage point 306.

Figure 6:
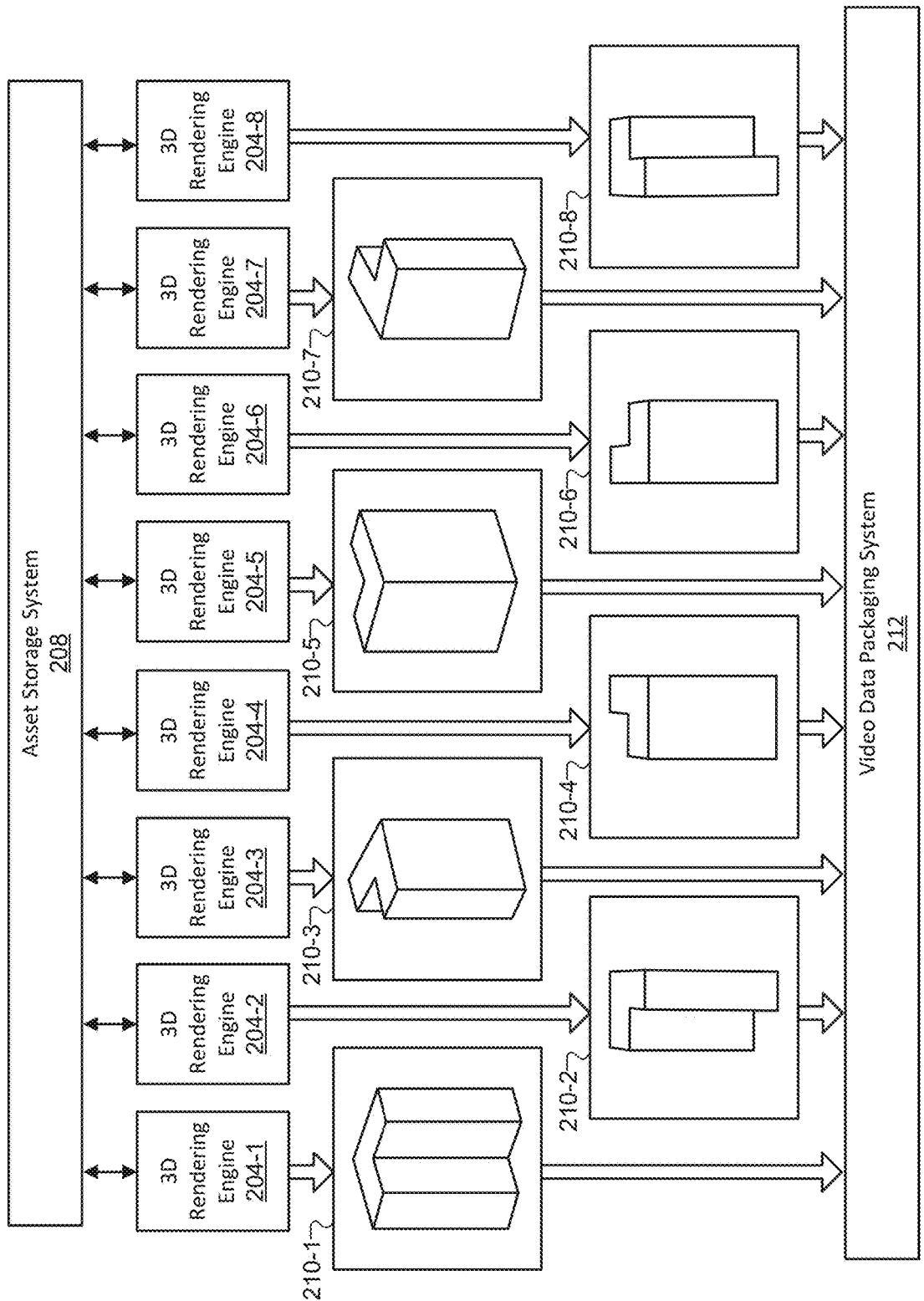
FIG. 6 illustrates exemplary three-dimensional ("3D") rendering engines that render surface data frames representative of color and depth data of surfaces of virtual objects visible from different vantage points based on an exemplary virtual entity description frame according to principles described herein.

To illustrate, FIG. 6 shows a more detailed view of certain components of configuration 200. Specifically, FIG. 6 illustrates eight 3D rendering engines 204 (i.e., 3D rendering engines 204-1 through 204-8) that render a complete set of surface data frames 210 (i.e., surface data frames 210-1 through 210-8). Surface data frames 210-1 through 210-8 may be representative of color and depth data of surfaces of virtual objects included within a virtual 3D space (e.g., virtual object 304 within virtual 3D space 302) as the surfaces would appear from different vantage points with respect to the virtual 3D space (e.g., virtual vantage points 306-1 through 306-8, respectively). It will be understood that, while surface data frames may each be represented in FIG. 6 by an image analogous to the color data image illustrated in FIG. 2 (i.e., the image illustrating color data 214), each surface data frame 210 may also include data representative of depth data, which may be represented by an image analogous to the depth data image illustrated in FIG. 2 (i.e., the image illustrating depth data 216).

3D rendering engines 204 may respectively generate surface data frames 210 from the associated virtual vantage points 306 based on virtual entity description frame 206, as well as based on data accessed from asset storage system 208, as described above. For example, the maintained data representative of the plurality of virtual entities associated with virtual scene 300 may include a link to color and depth data representative of virtual object 304 that is stored in asset storage system 208. As such, virtual entity description frame 206 (which may have been generated by system 100 and provided to 3D rendering engines 204 as described above) may be generated to include the link to the color and depth data representative of virtual object 304 stored in asset storage system 208. Each of 3D rendering engines 204 may be configured to render their respective surface data frames 210 from their respective virtual vantage points 306 by performing operations including receiving virtual entity description frame 206 from system 100, and accessing the color and depth data representative of virtual object 304 stored in asset storage system 208 from asset storage system 208 using the link included within virtual entity description frame 206. With both the data included within virtual entity description frame 206 and the color and depth data accessed from asset storage system 208, 3D rendering engines 204 may render surface data frames 210 to provide views of virtual 3D space 302 (e.g., including virtual object 304) from vantage points surrounding virtual 3D space 302, as shown.

Each surface data frame 210 may be included within a separate sequence of surface data frames representative of color and depth data of the surfaces of virtual object 304 visible from the respective virtual vantage point 306 during the temporal sequence. For example, surface data frame 210-1 may be included within a first sequence of surface data frames representative of color and depth data of the surfaces of virtual object 304 visible from virtual vantage point 306-1 during the temporal sequence, surface data frame 210-2 may be included within a second sequence of surface data frames representative of color and depth data of the surfaces of virtual object 304 visible from virtual vantage point 306-2 during the temporal sequence, and so forth. In other words, once surface data frames 210 have been rendered, each 3D rendering engine 204 may continue to render other surface data frames in different respective sequences of surface data frames. For example, 3D rendering engines 204 may receive additional virtual entity description frames after virtual entity description frame 206 (e.g., such as the sequence of virtual entity description frames 500 illustrated in FIG. 5), and may generate further surface data frames based upon the additional virtual entity description frames.

Figure 7:
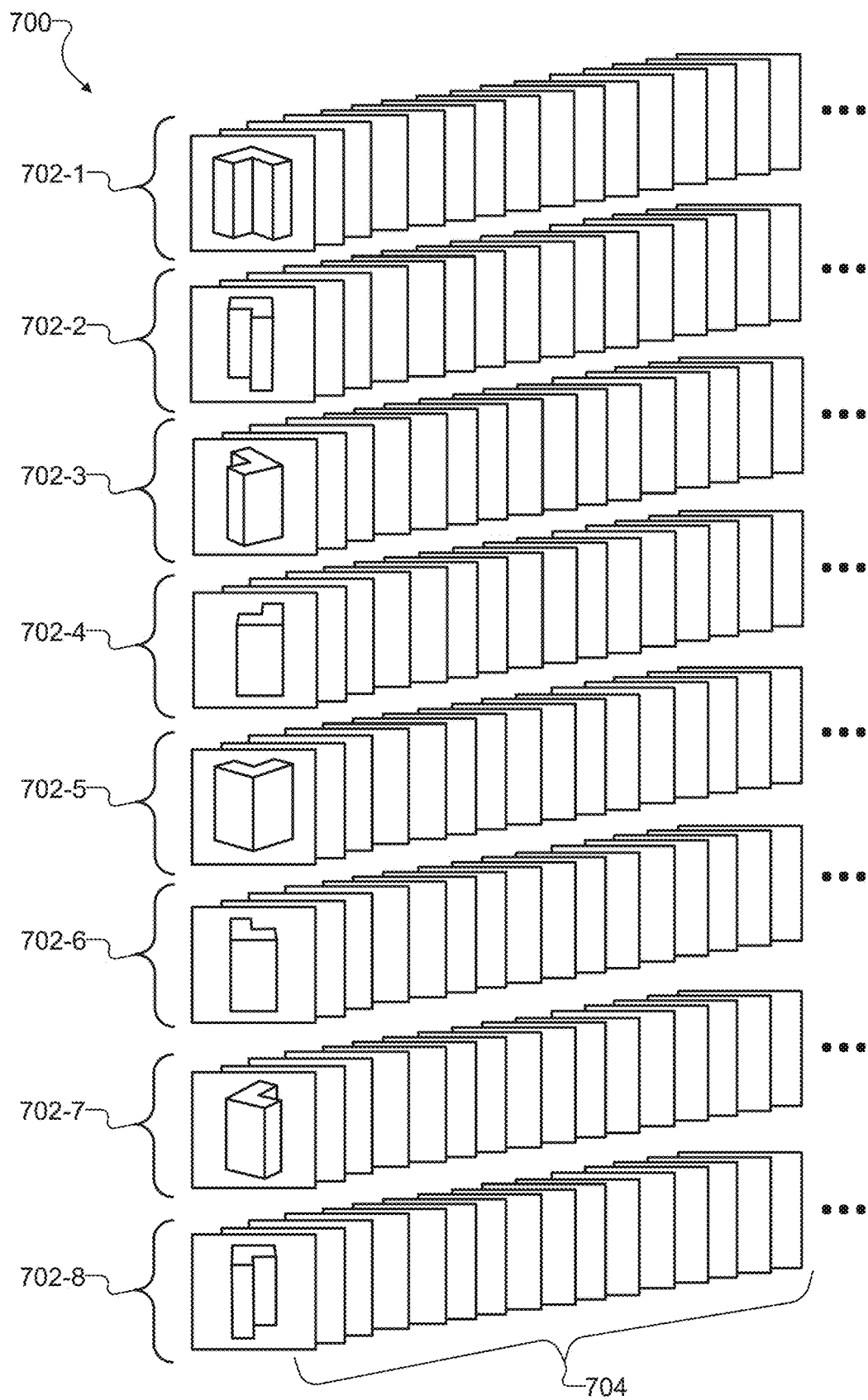
FIG. 7 illustrates a plurality of exemplary frame sequences of surface data frames representative of color and depth data of surfaces of an exemplary virtual object visible from different vantage points according to principles described herein.

To illustrate, FIG. 7 shows a plurality of exemplary frame sequences 702 (e.g., frame sequences 702-1 through 702-8) of surface data frames representative of color and depth data of surfaces of virtual object 304 visible from vantage points 306-1 through 306-8, respectively. For example, the first surface data frames in each frame sequence 702 (i.e., the surface data frames that are uncovered so that different views of object 304 are visible in FIG. 7) may correspond to surface data frames 210 illustrated in FIG. 6. Accordingly, frame sequences 702-1 through 702-8 may be associated, respectively, with 3D rendering engines 204-1 through 204-8 and, thus, with virtual vantage points 306-1 through 306-8. For example, frame sequence 702-1 may represent both the color and the depth of virtual objects included within virtual 3D space 302 as viewed from virtual vantage point 306-1 during a particular temporal sequence 704 (e.g., a particular period of real time, a particular virtual timeline associated with an immersive virtual reality world, etc.). Similarly, frame sequence 702-2 may represent the color and depth of virtual objects included within virtual 3D space 302 as viewed from virtual vantage point 306-2 during temporal sequence 704, and so forth for frame sequences 702-3 through 702-8.

As described and illustrated above, each of the surface data frames generated by 3D rendering engines 204 and included in frame sequences 702 may be transmitted or otherwise passed into video data packaging system 212, which may be communicatively coupled to 3D rendering engines 204. Based on each of the different frame sequences 702 of surface data frames, video data packaging system 212 may generate one or more transport streams to transmit a color video data stream and a depth video data stream for each of virtual vantage points 306. For example, video data packaging system 212 may generate a single transport stream that contains individual color video data streams and depth video data streams associated with each frame sequence 702 (i.e., associated with each 3D rendering engine 204 and virtual vantage point 306), or video data packaging system 212 may generate different transports streams for the color video data stream and depth video data stream associated with each frame sequence 702.

Once a transport stream is generated, video data packaging system 212 may provide the transport stream for streaming to a client-side media player device associated with a user. For example, video data packaging system 212 may stream (e.g., transmit by way of a network) the transport stream to the media player device itself, or may include the transport stream in a data pipeline in which the transport stream will be further processed and streamed to the media player device by another system (e.g., after being processed and/or repackaged by other devices, processes, and/or systems associated with the pipeline).

As mentioned above, in some examples, system 100 and/or other systems (e.g., other server-side systems) and devices described herein for rendering frames of a virtual scene from different vantage points based on a virtual entity description frame may be used to generate virtual reality media content to be experienced by users. For example, in addition to the operations described above, a virtual reality media content provider system (e.g., within which system 100, video data packaging system 212, and/or other devices and systems described herein may be included or with which these systems may otherwise be associated) may further generate and provide virtual reality media content based on the transport stream that video data packaging system 212 generates and provides. The virtual reality media content may be representative of a virtual scene and may be presentable to the user so as to be experienced from a dynamically selectable virtual vantage point corresponding to an arbitrary virtual location with respect to the virtual scene. For example, the dynamically selectable virtual vantage point may be selected by the user of the media player device while the user is experiencing the virtual scene using the media player device. Moreover, the virtual reality media content may be provided (e.g., by the virtual reality media content provider system that includes or is otherwise associated with system 100) to the media player device to allow the user to experience the virtual scene from the dynamically selectable virtual vantage point corresponding to the arbitrary virtual location within the virtual scene.

Figure 8:
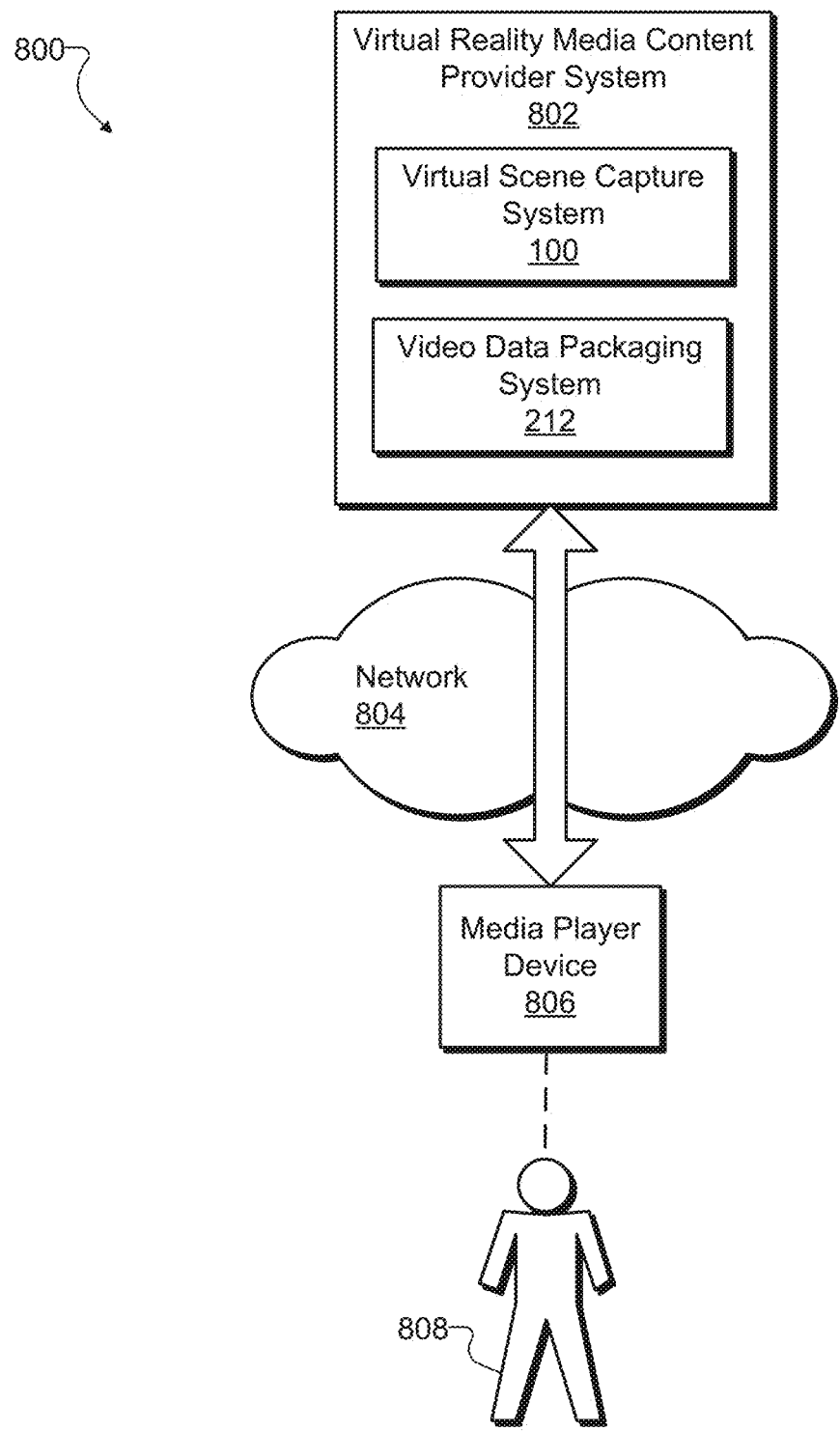
FIG. 8 illustrates an exemplary configuration in which an exemplary virtual reality media content provider system generates virtual reality media content that is provided by way of a network to an exemplary client-side media player device used by a user to experience a virtual scene according to principles described herein.

To illustrate, FIG. 8 shows an exemplary configuration 800 in which an exemplary virtual reality media content provider system 802 ("provider system 802") that includes system 100 and video data packaging system 212 generates virtual reality media content that is provided by way of a network 804 to an exemplary client-side media player device 806 ("media player device 806") used by a user 808 to experience a virtual scene.

After one or more transport streams have been generated based on frame sequences 702 as described above, provider system 802 may further encode, package, encrypt, or otherwise process the one or more transport streams to form virtual reality media content that media player device 806 may be configured to render. For example, the virtual reality media content may include or be representative of a plurality of 2D video data streams (e.g., 2D video data streams associated with color data and with depth data for each virtual vantage point 306) that may be rendered by media player device 806 so as to present a view of virtual scene 300 from any arbitrary virtual vantage point within virtual scene 300 (e.g., including virtual vantage points other than virtual vantage points 306 that may be of interest to user 808), as will be described below. Additionally or alternatively, the virtual reality media content may include data representative of one or more volumetric models (e.g., 3D or 4D models) of virtual objects included within virtual scene 300 that also may be rendered so as to be viewable from arbitrary virtual vantage points. The virtual reality media content may then be distributed by way of network 804 to one or more media player devices such as media player device 806 associated with user 808. For example, provider system 802 may provide the virtual reality media content to media player device 806 so that user 808 may experience virtual scene 300 virtually using media player device 806.

In some examples, it may be undesirable for user 808 to be limited to one or more discrete positions within an immersive virtual reality world represented by the virtual reality media content (e.g., representative of virtual scene 300). As such, provider system 802 may provide sufficient data within the virtual reality media content representative of virtual scene 300 to allow virtual scene 300 to be rendered not only from virtual vantage points 306, but from any dynamically selectable virtual vantage point corresponding to an arbitrary virtual location within virtual scene 300 (e.g. within or around virtual 3D space 302). For example, the dynamically selectable virtual vantage point may be selected by user 808 while user 808 is experiencing virtual scene 300 using media player device 806.

As used herein, an "arbitrary virtual location" may refer to any virtual point in space associated with a virtual scene (e.g., within or around a virtual 3D space of the virtual scene). For example, arbitrary virtual locations are not limited to fixed positions surrounding the virtual scene (e.g., fixed positions associated with virtual vantage points 306), but also include all the positions between the positions associated with virtual vantage points 306 and positions inside of virtual 3D space 302. Moreover, arbitrary virtual locations may be associated with arbitrary virtual vantage points not limited to aligning with any of virtual vantage points 306. In some examples, such arbitrary virtual locations may correspond to the most desirable virtual vantage points within virtual scene 300. For instance, if virtual scene 300 includes a basketball game, user 808 may dynamically select virtual vantage points from which to experience the game that are in any arbitrary virtual location on the basketball court. For example, the user may dynamically select his or her virtual vantage points to follow the basketball up and down the basketball court and experience the basketball game as if standing on the basketball court in the middle of the action of the game. In other words, for example, while virtual vantage points 306 may be positioned at fixed positions surrounding the basketball court, user 808 may dynamically select arbitrary virtual vantage points from which to experience the game that are associated with any arbitrary position on the basketball court.

Network 804 may include a provider-specific wired or wireless network (e.g., a cable or satellite carrier network or a mobile telephone network), the Internet, a wide area network, a content delivery network, or any other suitable network. Data may flow between provider system 802 and media player device 806 (as well as other media player devices not explicitly shown) using any communication technologies, devices, media, and protocols as may serve a particular implementation.

Media player device 806 may be used by user 808 to access and experience virtual reality media content received from provider system 802. For example, media player device 806 may be configured to generate (e.g., based on the color video data stream and the depth video data stream for each of the virtual vantage points included within the transport stream, which may be 2D video data streams) a 3D representation of virtual 3D space 302 of virtual scene 300 to be experienced by user 808 from an arbitrary virtual vantage point (e.g., a dynamically selectable virtual vantage point selected by the user and corresponding to an arbitrary virtual location within virtual 3D space 302). To this end, media player device 806 may include or be implemented by any device capable of presenting a field of view of an immersive virtual reality world (e.g., an immersive virtual reality world representative of virtual scene 300) and detecting user input from user 808 to dynamically update the immersive virtual reality world presented within the field of view as user 808 experiences the immersive virtual reality world.

Figure 9:
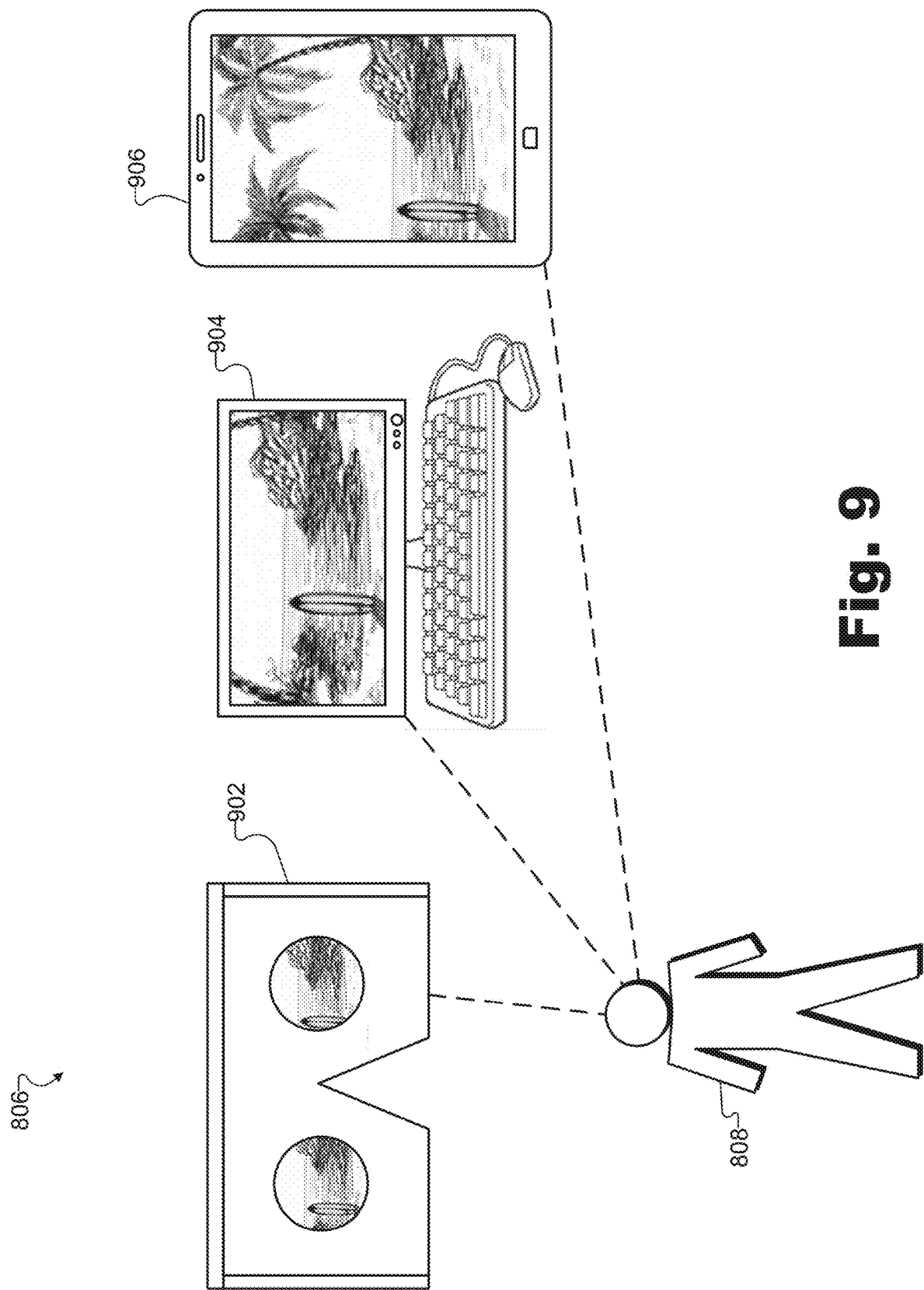
FIG. 9 illustrates various exemplary types of media player devices that may be used by a user to experience virtual reality media content according to principles described herein.

For example, FIG. 9 shows various exemplary types of media player devices 806 that may be used by user 808 to experience virtual reality media content. Specifically, as shown, media player device 806 may take one of several different form factors such as a head-mounted virtual reality device 902 (e.g., a virtual reality gaming device) that includes a head-mounted display screen, a personal computer device 904 (e.g., a desktop computer, laptop computer, etc.), a mobile or wireless device 906 (e.g., a smartphone, a tablet device, etc., possibly mounted to the head of user 808 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 808.

Figure 10:
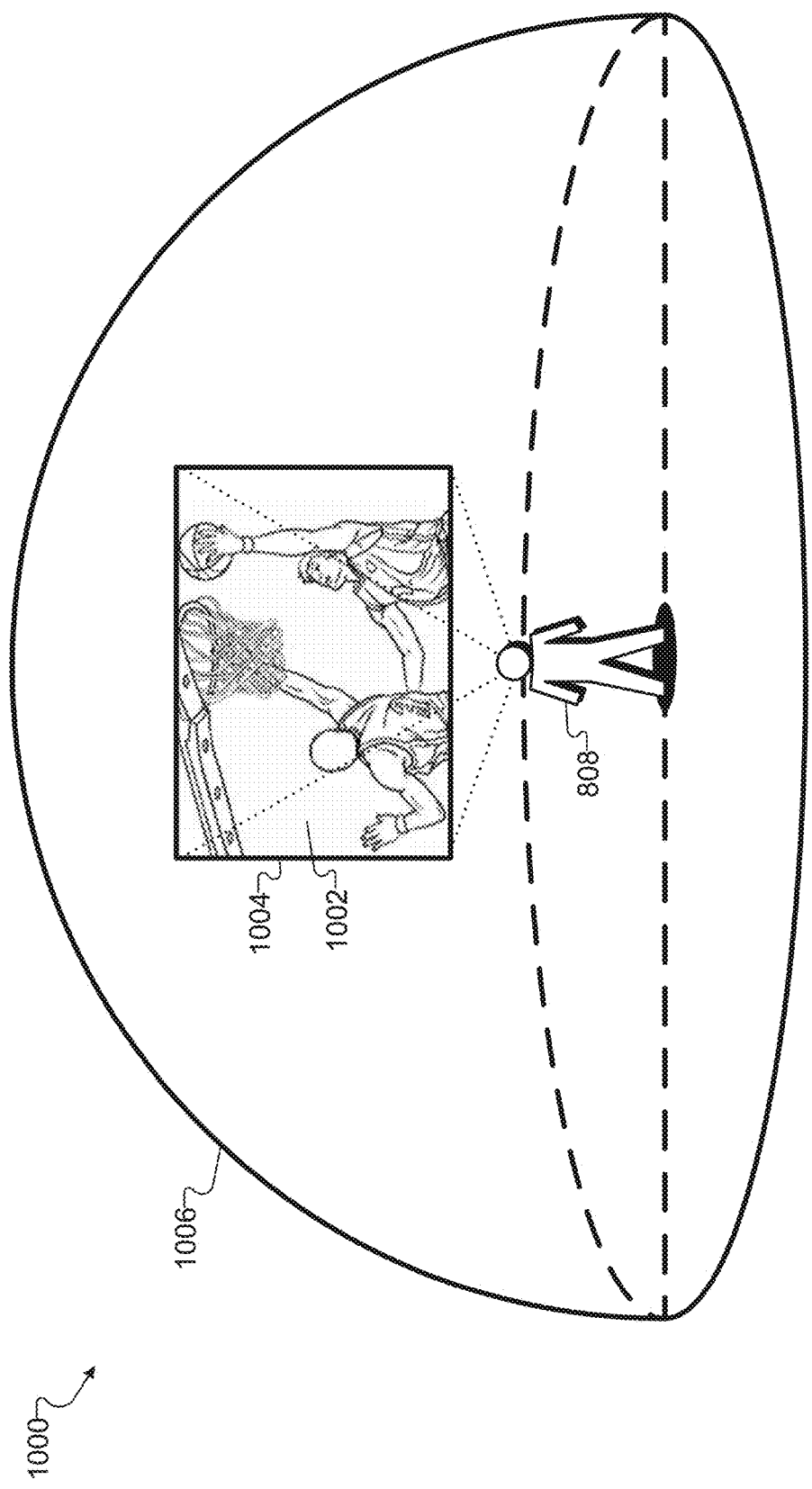
FIG. 10 illustrates an exemplary virtual reality experience in which a user is presented with exemplary virtual reality media content representative of a virtual scene as experienced from a dynamically selectable virtual vantage point corresponding to an exemplary arbitrary virtual location with respect to the virtual scene according to principles described herein.

FIG. 10 illustrates an exemplary virtual reality experience 1000 in which user 808 is presented with exemplary virtual reality media content representative of a virtual scene as experienced from a dynamically selectable virtual vantage point corresponding to an exemplary arbitrary virtual location with respect to the virtual scene. Specifically, virtual reality media content 1002 is presented within a field of view 1004 that shows a virtual scene from a virtual vantage point corresponding to an arbitrary virtual location right underneath a basketball standard within the virtual 3D space of the virtual scene where a shot is being made. An immersive virtual reality world 1006 based on the virtual scene may be available for the viewer to experience by providing user input (e.g., head movements, keyboard input, etc.) to look around and/or to move around (i.e., dynamically select a virtual vantage point from which to experience) immersive virtual reality world 1006.

For example, field of view 1004 may provide a window through which user 808 may easily and naturally look around immersive virtual reality world 1006. Field of view 1004 may be presented by media player device 806 (e.g., on a display screen of media player device 806) and may include video depicting objects surrounding the user within immersive virtual reality world 1006. Additionally, field of view 1004 may dynamically change in response to user input provided by user 808 as user 808 experiences immersive virtual reality world 1006. For example, media player device 806 may detect user input (e.g., moving or turning the display screen upon which field of view 1004 is presented). In response, field of view 1004 may display different objects and/or objects seen from a different virtual vantage point or virtual location in place of the objects seen from the previous virtual vantage point or virtual location.

In FIG. 10, immersive virtual reality world 1006 is illustrated as a semi-sphere, indicating that user 808 may look in any direction within immersive virtual reality world 1006 that is substantially forward, backward, left, right, and/or up from the virtual vantage point of the location under the basketball standard that user 808 has currently selected. In other examples, immersive virtual reality world 1006 may include an entire 360° by 180° sphere such that user 808 may also look down. Additionally, user 808 may move around to other locations within immersive virtual reality world 1006 (i.e., dynamically selecting different dynamically selectable virtual vantage points within the virtual 3D space). For example, user 808 may select a virtual vantage point at half court, a virtual vantage point from the free-throw line facing the basketball standard, a virtual vantage point suspended above the basketball standard, or the like.

Figure 11:
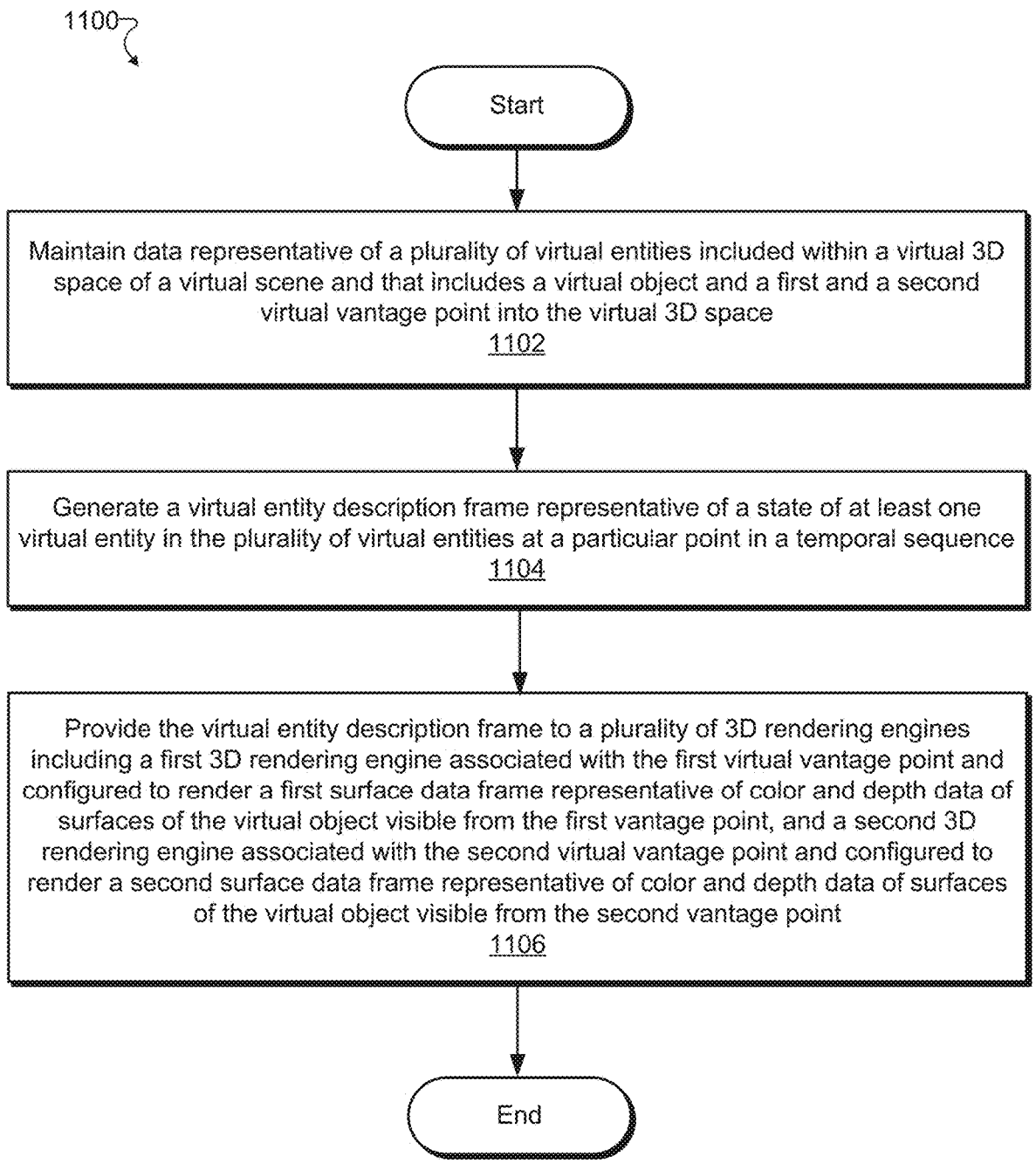
FIG. 11 illustrates an exemplary method for rendering frames of a virtual scene from different vantage points based on a virtual entity description frame of the virtual scene according to principles described herein.

FIG. 11 illustrates an exemplary method 1100 for rendering frames of a virtual scene from different vantage points based on a virtual entity description frame of the virtual scene. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or by any implementation thereof.

In operation 1102, a virtual scene capture system may maintain data representative of a plurality of virtual entities included within a virtual 3D space of a virtual scene. The plurality of virtual entities may include a virtual object and a plurality of virtual vantage points into the virtual 3D space. Specifically, for example, the plurality of virtual vantage points may include a first virtual vantage point and a second virtual vantage point different from the first virtual vantage point. Operation 1102 may be performed in any of the ways described herein.

In operation 1104, the virtual scene capture system may generate a virtual entity description frame representative of a state of at least one virtual entity in the plurality of virtual entities at a particular point in a temporal sequence. For example, the virtual scene capture system may generate the virtual entity description frame based on the maintained data representative of the plurality of virtual entities. Operation 1104 may be performed in any of the ways described herein.

In operation 1106, the virtual scene capture system may provide the virtual entity description frame generated in operation 1104 to a plurality of server-side 3D rendering engines associated with a content provider system. For example, the virtual scene capture system may provide the virtual entity description frame to a first 3D rendering engine associated with the first virtual vantage point and configured to render, based on the virtual entity description frame, a first surface data frame representative of color and depth data of surfaces of the virtual object visible from the first virtual vantage point at the particular point in the temporal sequence. Moreover, the virtual scene capture system may provide the virtual entity description frame to a second 3D rendering engine associated with the second virtual vantage point and configured to render, based on the virtual entity description frame, a second surface data frame representative of color and depth data of surfaces of the virtual object visible from the second virtual vantage point at the particular point in the temporal sequence. Operation 1106 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
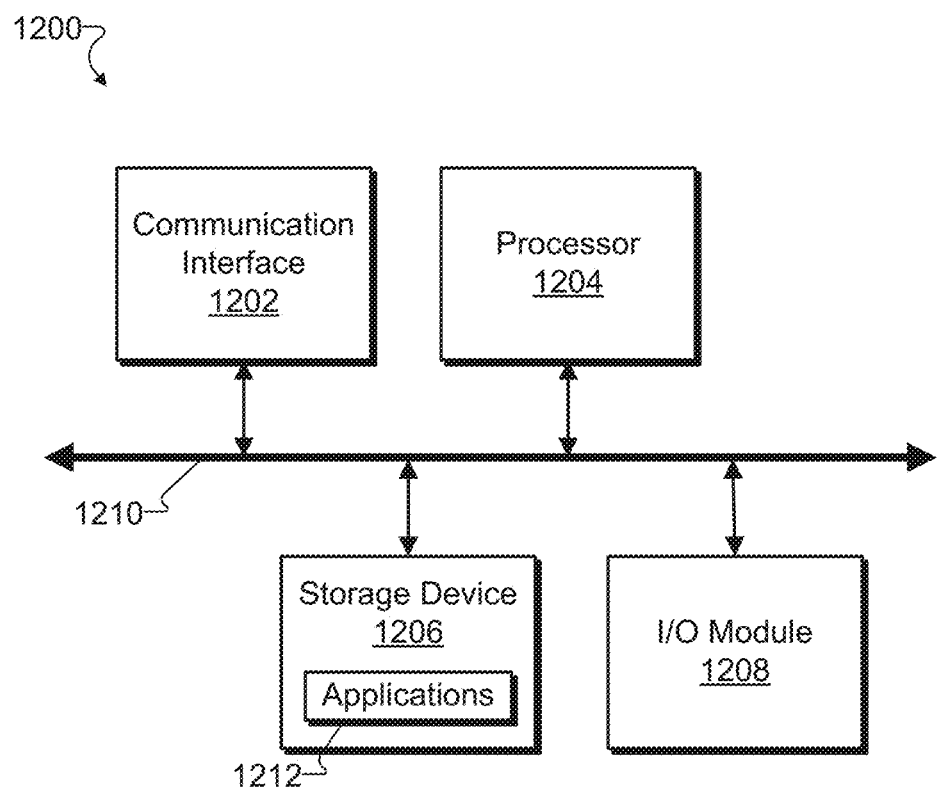
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit (e.g., a central processing unit and/or a graphics processing unit) capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more operations or functions associated with virtual entity state tracking facility 102 or virtual entity description frame facility 104 of system 100 (see FIG. 1). Likewise, storage facility 106 of system 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a virtual scene capture system, state data for a virtual object and a virtual vantage point that are both included within a virtual three-dimensional (3D) space of a virtual scene;
   generating, by the virtual scene capture system based on the maintained state data, a key description frame representative of a state of the virtual object and a state of the virtual vantage point at a first point in a temporal sequence, the key description frame including a link to color data representative of the virtual object and stored in an asset storage server associated with the virtual scene capture system;
   determining, by the virtual scene capture system for a second point in the temporal sequence subsequent to the first point, that the state of the virtual object has been modified and the state of the virtual vantage point has remained static since the first point;
   generating, by the virtual scene capture system based on the determining that the state of the virtual object has been modified and the state of the virtual vantage point has remained static since the first point, an update description frame that represents only the state of the virtual object and not the state of the virtual vantage point at the second point in the temporal sequence; and
   providing, by the virtual scene capture system, the key description frame and the update description frame to a 3D rendering engine server associated with the virtual vantage point and configured to render, based on state data represented in the key and update description frames and color data representative of the virtual object and accessed from the asset storage server using the link, color data frames associated with the virtual vantage point.

2. The method of claim 1, wherein the key description frame is associated with a sequence number indicative of a position of the key description frame in the temporal sequence with respect to other key description frames in the temporal sequence.

3. The method of claim 1, wherein the update description frame is associated with a sequence number indicative of a position of the update description frame in the temporal sequence with respect to the key description frame and with respect to other update description frames in the temporal sequence.

4. The method of claim 1, further comprising:
   receiving, by the virtual scene capture system from a virtual scene control server, a command to modify the maintained state data; and
   modifying, by the virtual scene capture system in response to the receiving of the command, the maintained state data in accordance with the command.

5. The method of claim 4, wherein the modifying of the maintained state data in accordance with the command includes at least one of:
   adding, to the maintained state data, additional state data for an additional virtual object included within the virtual 3D space of the virtual scene;
   replacing, within the maintained state data, the state data for the virtual object with the additional state data for the additional virtual object;
   removing, from the maintained state data, the state data for the virtual object; and
   modifying, within the maintained state data, at least one property of the state of the virtual object.

6. The method of claim 4, wherein the modifying of the maintained state data in accordance with the command includes at least one of:
   adding, to the maintained state data, additional state data for an additional virtual vantage point into the virtual 3D space of the virtual scene;
   modifying, within the maintained state data, the state data for the virtual vantage point; and
   removing, from the maintained state data, the state data for the virtual vantage point.

7. The method of claim 1, wherein:
   the maintained state data further includes state data for a second virtual vantage point into the virtual 3D space of the virtual scene, the second virtual vantage point different from the virtual vantage point;
   the providing of the key description frame and the update description frame further comprises providing the key and update description frames to a second 3D rendering engine server associated with the second virtual vantage point and configured to render, based on the state data represented in the key and update description frames and the color data representative of the virtual object and accessed from the asset storage server using the link, additional color data frames associated with the second virtual vantage point.

8. The method of claim 1, wherein:
   the key description frame further includes an additional link to depth data representative of the virtual object and stored in the asset storage server; and
   the 3D rendering engine server is configured to render, based on the state data and based on the color data and the depth data accessed from the asset storage server using the link and the additional link, respectively, a surface data frame associated with the virtual vantage point.

9. A system comprising:
   an asset storage server storing color data representative of a virtual object included within a virtual three-dimensional (3D) space of a virtual scene; and
   a virtual entity state tracking server communicatively coupled to the asset storage server and configured to:
      maintain state data for the virtual object and for a virtual vantage point into the 3D space,
      generate, based on the maintained state data, a key description frame representative of a state of the virtual object and a state of the virtual vantage point at a first point in a temporal sequence, the key description frame including a link to the color data stored in the asset storage server,
      determine, for a second point in the temporal sequence subsequent to the first point, that the state of the virtual object has been modified and the state of the virtual vantage point has remained static since the first point, and
      generate, based on the determining that the state of the virtual object has been modified and the state of the virtual vantage point has remained static since the first point, an update description frame that represents only the state of the virtual object and not the state of the virtual vantage point at the second point in the temporal sequence; and a 3D rendering engine server associated with the virtual vantage point and communicatively coupled to the asset storage server and the virtual entity state tracking server, the 3D rendering engine server configured to render, based on state data represented in the key and update description frames and color data representative of the virtual object and accessed from the asset storage server using the link, color data frames associated with the virtual vantage point.

10. The system of claim 9, wherein the key description frame is associated with a sequence number indicative of a position of the key description frame in the temporal sequence with respect to other key description frames in the temporal sequence.

11. The system of claim 9, wherein the update description frame is associated with a sequence number indicative of a position of the update description frame in the temporal sequence with respect to the key description frame and with respect to other update description frames in the temporal sequence.

12. The system of claim 9, wherein the virtual entity state tracking server is further configured to:
receive, from a virtual scene control server, a command to modify the maintained state data; and
modify, in response to the receiving of the command, the maintained state data in accordance with the command.

13. The system of claim 12, wherein the modifying of the maintained state data in accordance with the command includes at least one of:
adding, to the maintained state data, additional state data for an additional virtual object included within the virtual 3D space of the virtual scene;
replacing, within the maintained state data, the state data for the virtual object with the additional state data for the additional virtual object;
removing, from the maintained state data, the state data for the virtual object; and
modifying, within the maintained state data, at least one property of the state of the virtual object.

14. The system of claim 12, wherein the modifying of the maintained state data in accordance with the command includes at least one of:
adding, to the maintained state data, additional state data for an additional virtual vantage point into the virtual 3D space of the virtual scene;
modifying, within the maintained state data, the state data for the virtual vantage point; and
removing, from the maintained state data, the state data for the virtual vantage point.

15. The system of claim 9, wherein:
the maintained state data further includes state data for a second virtual vantage point into the virtual 3D space of the virtual scene, the second virtual vantage point different from the virtual vantage point;
the system further comprises a second 3D rendering engine server associated with the second virtual vantage point and communicatively coupled to the asset storage server and the virtual entity state tracking server, the second 3D rendering engine server configured to render, based on the state data represented in the key and update virtual entity description frames and the color data representative of the virtual object and accessed from the asset storage server using the link, additional color data frames associated with the second virtual vantage point.

16. The system of claim 9, wherein:
the asset storage server further stores depth data representative of the virtual object;
the key description frame further includes an additional link to the depth data; and
the 3D rendering engine server is configured to render, based on the state data and based on the color data and the depth data accessed from the asset storage server using the link and the additional link, respectively, a surface data frame associated with the virtual vantage point.

17. The system of claim 9, further comprising a video data packaging server communicatively coupled to the 3D rendering engine server and configured to:
generate, based on a sequence of color data frames including the color data frames, a transport stream that includes a color video data stream for the virtual vantage point; and
provide the transport stream for streaming to a media player device associated with a user and configured to generate, based on the color video data stream included within the transport stream, a 3D representation of the virtual 3D space of the virtual scene to be experienced by the user from a dynamically selectable virtual vantage point selected by the user and corresponding to an arbitrary virtual location within the virtual 3D space.

18. A non-transitory computer-readable medium storing instructions that, when executed, direct a processor of a computing device to:
maintain state data for a virtual object and a virtual vantage point that are both included within a virtual three-dimensional (3D) space of a virtual scene;
generate, based on the maintained state data, a key description frame representative of a state of the virtual object and a state of the virtual vantage point at a first point in a temporal sequence, the key description frame including a link to color data representative of the virtual object and stored in an asset storage server associated with the computing device;
determine, for a second point in the temporal sequence subsequent to the first point, that the state of the virtual object has been modified and the state of the virtual vantage point has remained static since the first point; and
generate, based on the determining that the state of the virtual object has been modified and the state of the virtual vantage point has remained static since the first point, an update description frame that represents only the state of the virtual object and not the state of the virtual vantage point at the second point in the temporal sequence; and
provide the key and update description frames to a 3D rendering engine server associated with the virtual vantage point and configured to render, based on state data represented in the key and update description frames and color data representative of the virtual object and accessed from the asset storage server using the link, color data frames associated with the virtual vantage point.

19. The non-transitory computer-readable medium of claim 18, wherein the key description frame is associated with a sequence number indicative of a position of the key description frame in the temporal sequence with respect to other key description frames in the temporal sequence.

20. The non-transitory computer-readable medium of claim 18, wherein the update description frame is associated with a sequence number indicative of a position of the update description frame in the temporal sequence with respect to the previous key description frame and with respect to other update description frames in the temporal sequence.

* * * * *